(12) United States Patent
Mohammed et al.

(10) Patent No.: US 9,342,228 B2
(45) Date of Patent: May 17, 2016

(54) DEVICE AND METHOD FOR FILTERING MESSAGES USING SLIDING TOUCH INPUT

(71) Applicant: BLACKBERRY LIMITED, Waterloo (CA)

(72) Inventors: Tawfik Mohammed, Ottawa (CA); Thomas Leonard Trevor Plestid, Ottawa (CA); Jeffrey Charles Bos, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 240 days.

(21) Appl. No.: 13/943,882

(22) Filed: Jul. 17, 2013

(65) Prior Publication Data
US 2015/0026592 A1    Jan. 22, 2015

(51) Int. Cl.
| | | |
|---|---|---|
| *G06F 3/048* | (2013.01) | |
| *G06F 3/0484* | (2013.01) | |
| *G06F 3/0488* | (2013.01) | |
| *G06F 1/16* | (2006.01) | |
| *G06F 3/0482* | (2013.01) | |
| *G06Q 10/10* | (2012.01) | |
| *H04M 1/725* | (2006.01) | |

(52) U.S. Cl.
CPC .......... *G06F 3/04847* (2013.01); *G06F 1/1626* (2013.01); *G06F 3/0482* (2013.01); *G06F 3/0488* (2013.01); *G06F 3/04883* (2013.01); *G06F 3/04886* (2013.01); *G06Q 10/107* (2013.01); *H04M 1/72552* (2013.01)

(58) Field of Classification Search
CPC ...................................................... H04L 51/22
USPC .................................. 715/752, 863; 345/173
See application file for complete search history.

(56) References Cited

U.S. PATENT DOCUMENTS

| | | | |
|---|---|---|---|
| 8,914,752 | B1 | 12/2014 | Spiegel |
| 2005/0223077 | A1 | 10/2005 | Vellanki et al. |
| 2008/0171535 | A1 | 7/2008 | Carmody et al. |
| 2009/0083658 | A1 | 3/2009 | Ito et al. |
| 2009/0247112 | A1* | 10/2009 | Lundy et al. ............... 455/404.1 |

(Continued)

FOREIGN PATENT DOCUMENTS

| | | |
|---|---|---|
| EP | 2369820 A2 | 9/2011 |
| EP | 2584440 A1 | 4/2013 |

OTHER PUBLICATIONS

Extended European Search Report dated Dec. 16, 2014, issued on Corresponding European Patent Application No. 14177335.8.

(Continued)

*Primary Examiner* — Ajay Bhatia
*Assistant Examiner* — Phuong Nguyen
(74) *Attorney, Agent, or Firm* — Perry + Currier, Inc.

(57) ABSTRACT

A device and method for filtering messages using sliding touch input are provided. The device comprises a processor; a memory storing messages of different types, at least a subset of the messages designated as unread messages; and a touchscreen including a display. A sliding touch input is detected at the touchscreen, the sliding touch input comprising a first portion in a first direction and a second portion in a second direction such that the sliding touch input includes a change in direction. In response, the messages are filtered according to one or more of a first filtering condition associated with the first portion and a second filtering condition associated with the second portion, to filter the messages according to one or more of type and a read status.

18 Claims, 26 Drawing Sheets

(56) References Cited

U.S. PATENT DOCUMENTS

| | | |
|---|---|---|
| 2010/0134425 A1 | 6/2010 | Storrusten |
| 2011/0157029 A1* | 6/2011 | Tseng .......................... 345/173 |
| 2011/0231499 A1* | 9/2011 | Stovicek et al. ............. 709/206 |
| 2011/0252369 A1 | 10/2011 | Chaudhri |
| 2012/0290947 A1 | 11/2012 | Baggett et al. |
| 2013/0097566 A1 | 4/2013 | Berglund |
| 2013/0102281 A1* | 4/2013 | Kanda et al. .................. 455/410 |
| 2013/0145290 A1 | 6/2013 | Weber et al. |
| 2013/0145295 A1 | 6/2013 | Bocking et al. |
| 2013/0187873 A1 | 7/2013 | Jeong |
| 2014/0165012 A1* | 6/2014 | Shen ..................... G06F 9/4451 715/863 |
| 2014/0267068 A1* | 9/2014 | Smith .......................... 345/173 |

OTHER PUBLICATIONS

Extended European Search Report dated Dec. 16, 2014, issued on Corresponding European Patent Application No. 14177344.0.

* cited by examiner

DEVICE AND METHOD FOR FILTERING MESSAGES USING SLIDING TOUCH INPUT

FIELD

The specification relates generally to electronic devices, and specifically to a device and method for filtering messages using sliding touch input.

BACKGROUND

The evolution of computers is currently quite active in the electronic device environment. It is now well-known to include messaging functions in electronic devices. More recently, there has been a veritable explosion of the number and type of applications that are configured to the unique form factors and computing environments of electronic devices.

BRIEF DESCRIPTIONS OF THE DRAWINGS

For a better understanding of the various implementations described herein and to show more clearly how they may be carried into effect, reference will now be made, by way of example only, to the accompanying drawings in which.

Figure 1:
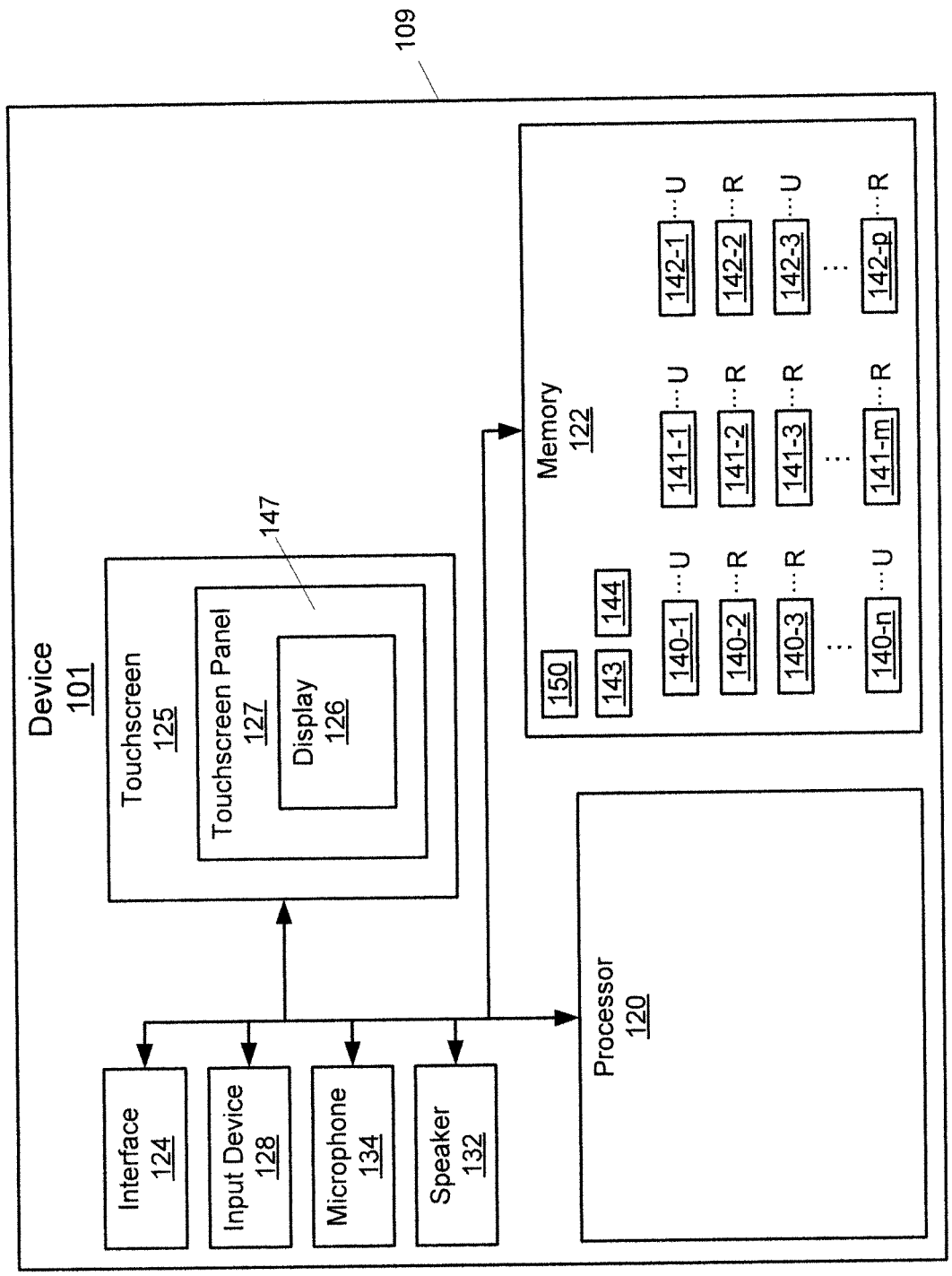
FIG. 1 depicts a schematic diagram of a device for filtering messages, according to non-limiting implementations.
Figure 18:
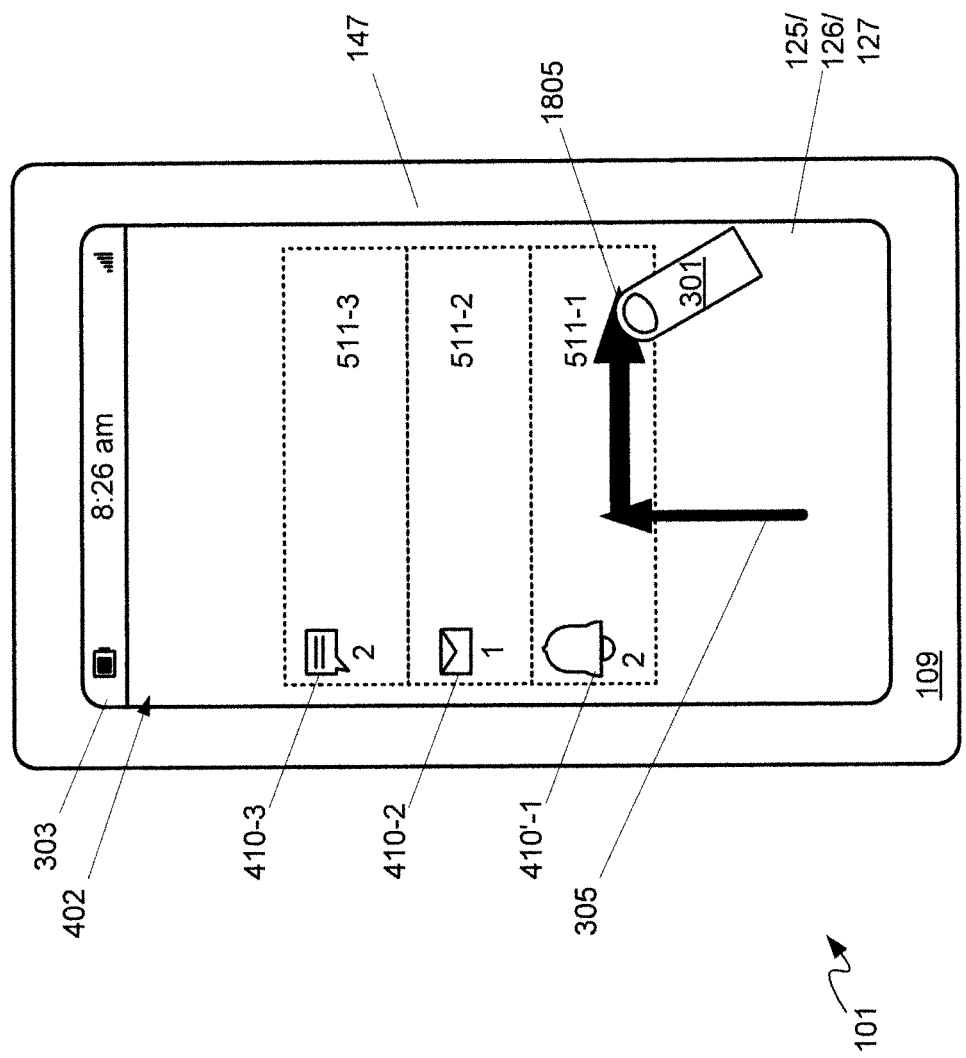
FIG. 18 depicts a perspective view of the device of FIG. 1, showing a GUI for filtering messages, a first portion of sliding touch input being received at the device, and a second portion of sliding touch input being received at the device, the second portion being received within a threshold time period, according to non-limiting implementations.
Figure 19:
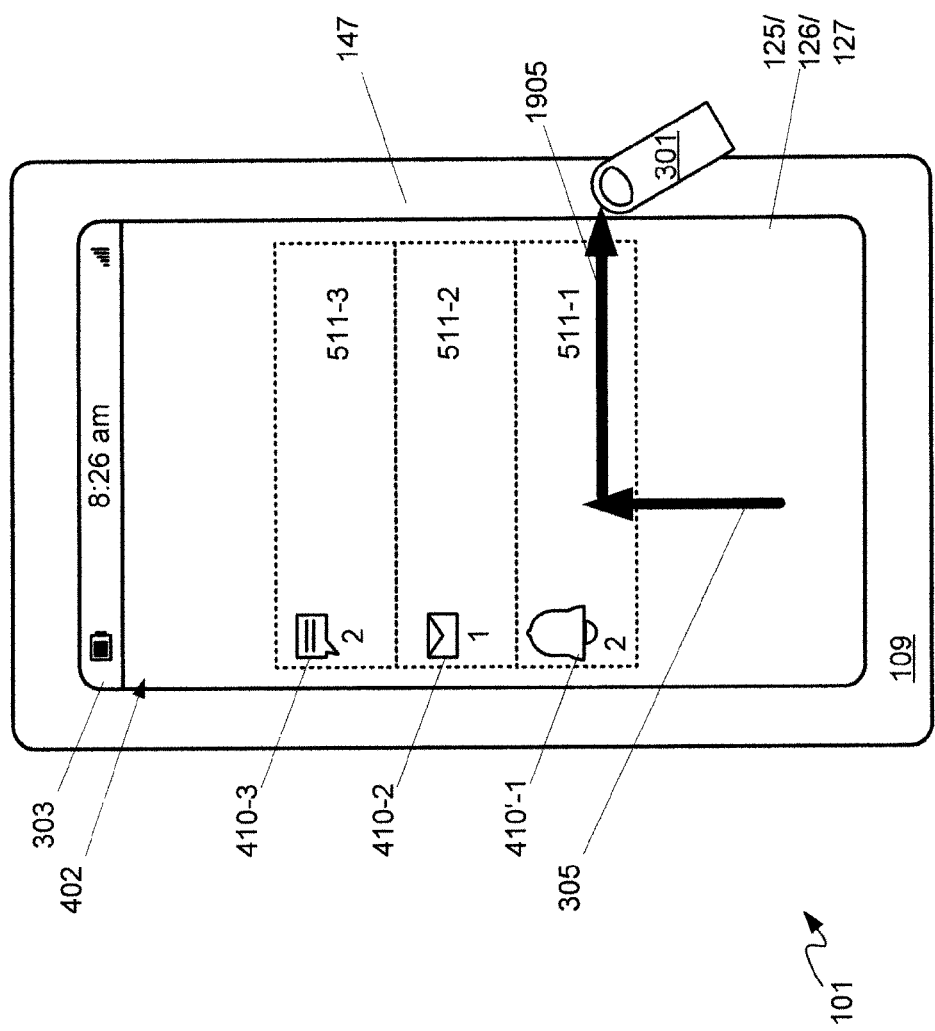
FIG. 19 depicts a perspective view of the device of FIG. 1, showing a GUI for filtering messages, a first portion of sliding touch input being received at the device, and a second portion of sliding touch input being received at the device, the second portion including touch data from a bezel portion of a touchscreen of the device, according to non-limiting implementations.
Figure 20:
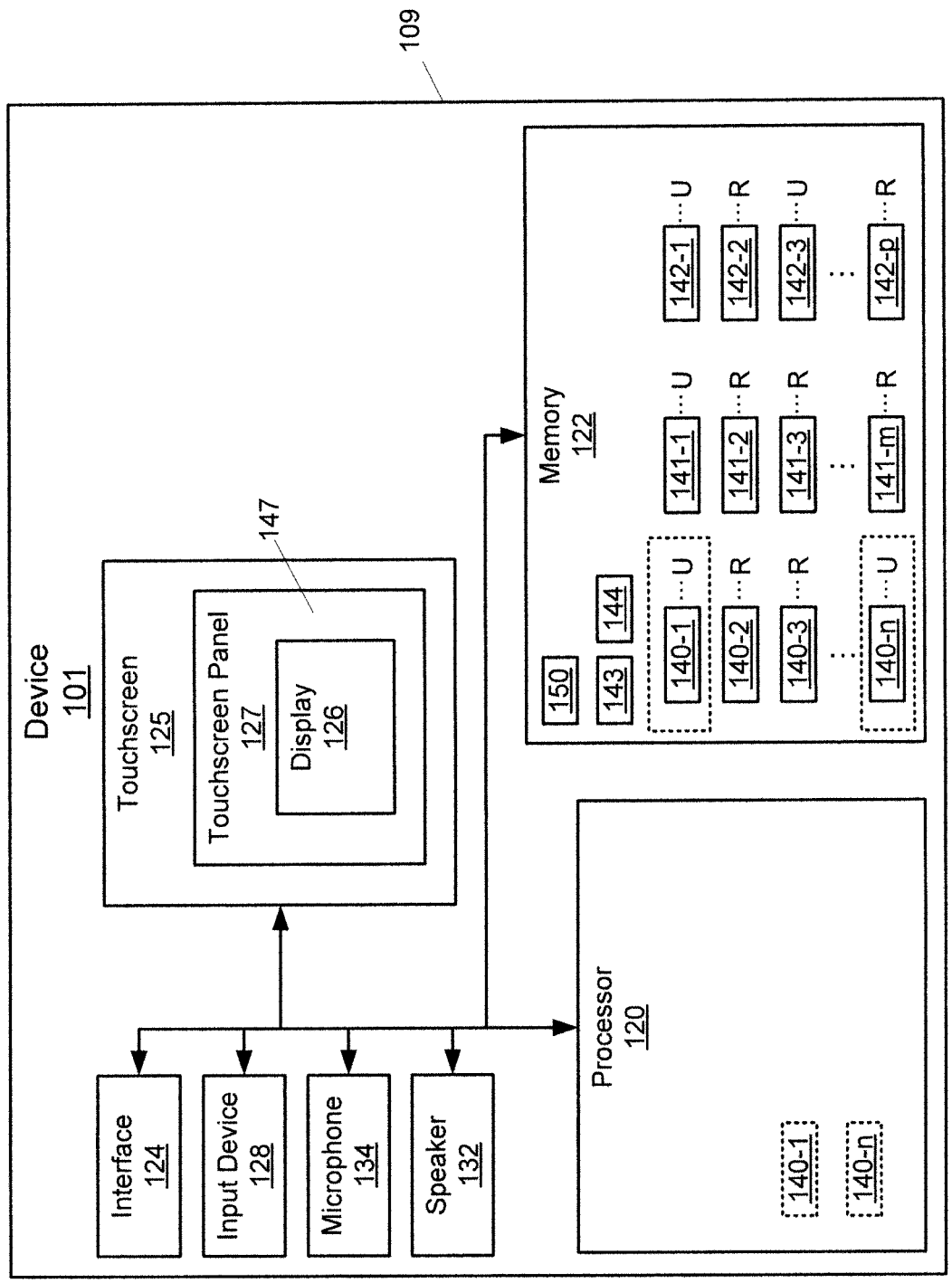

FIG. 20 depicts the device of FIG. 1, and a processor thereof, applying a first filtering condition, associated with the first portion of the sliding touch input, and a second filtering condition, associated with the second portion of the sliding touch input to messages stored therein, in response to receiving the first portion and the second portion of FIG. 18 and/or FIG. 19, according to non-limiting implementations.

Figure 21:
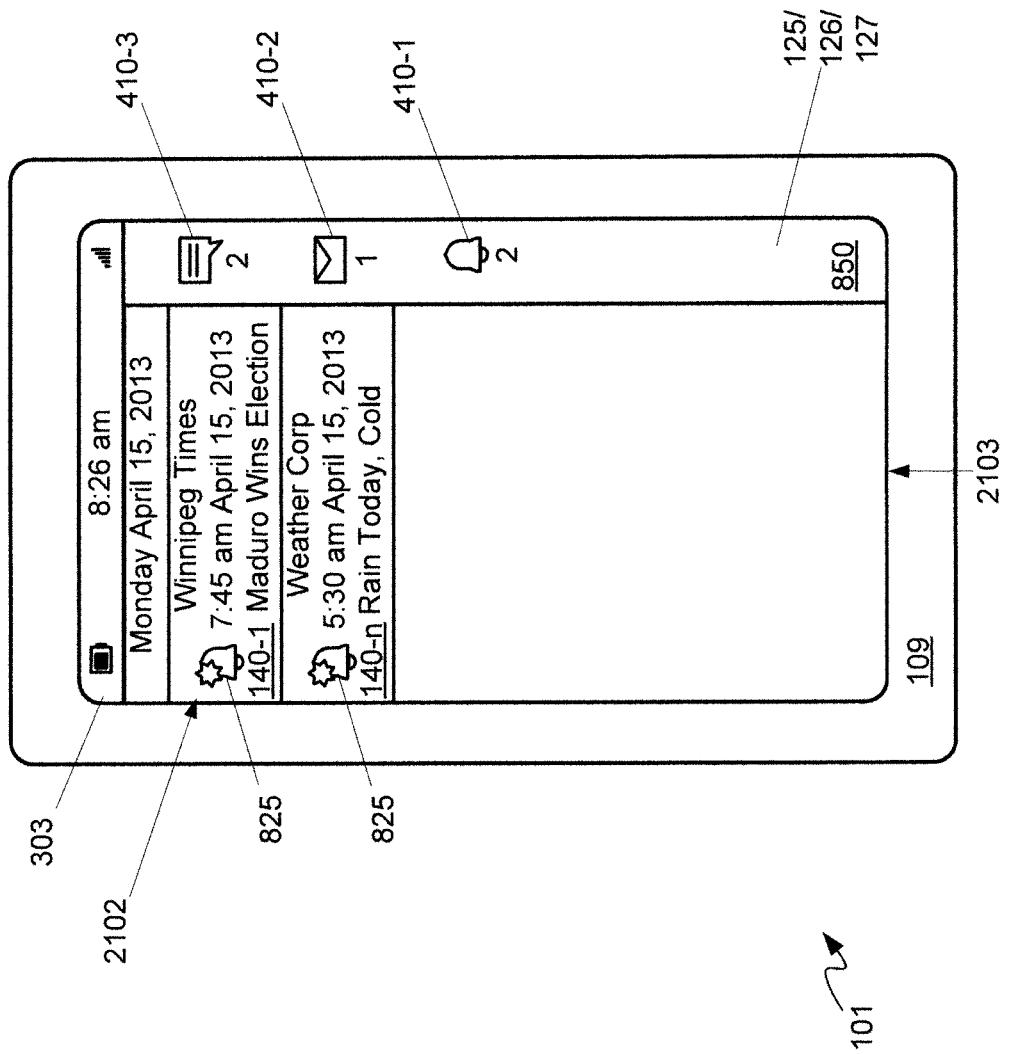

FIG. 21 depicts a perspective view of the device of FIG. 1, showing a resulting GUI of a list of selected messages after the first filtering condition and the second filtering condition of FIG. 20 are applied, according to non-limiting implementations.

Figure 22:
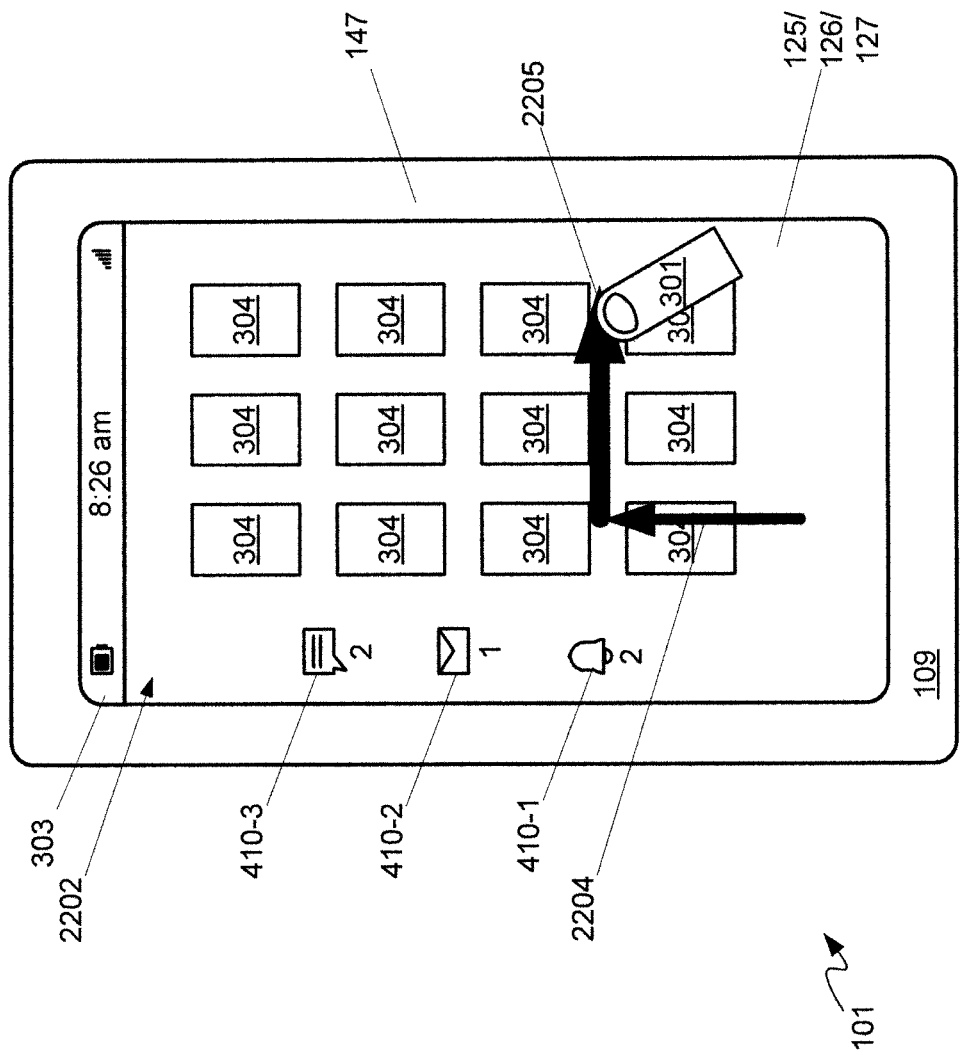

FIG. 22 depicts a perspective view of the device of FIG. 1, showing a GUI for filtering messages, a first portion of sliding touch input being received at the device, and a second portion of sliding touch input being received at the device, the second portion being received within a threshold time period, according to non-limiting implementations.

Figure 23:
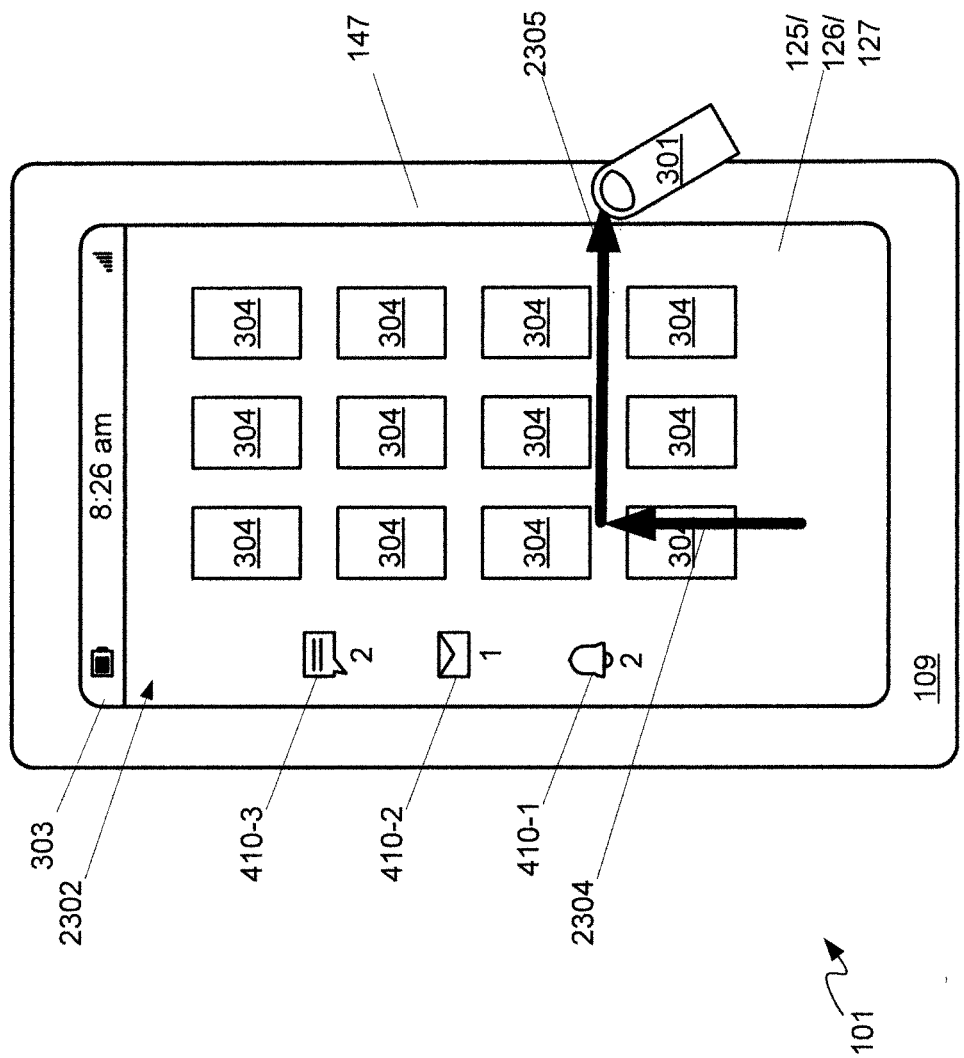

FIG. 23 depicts a perspective view of the device of FIG. 1 showing a GUI for filtering messages, a first portion of sliding touch input being received at the device, and a second portion of sliding touch input being received at the device, the second portion including touch data from a bezel portion of a touch-screen of the device, according to non-limiting implementations.

Figure 24:
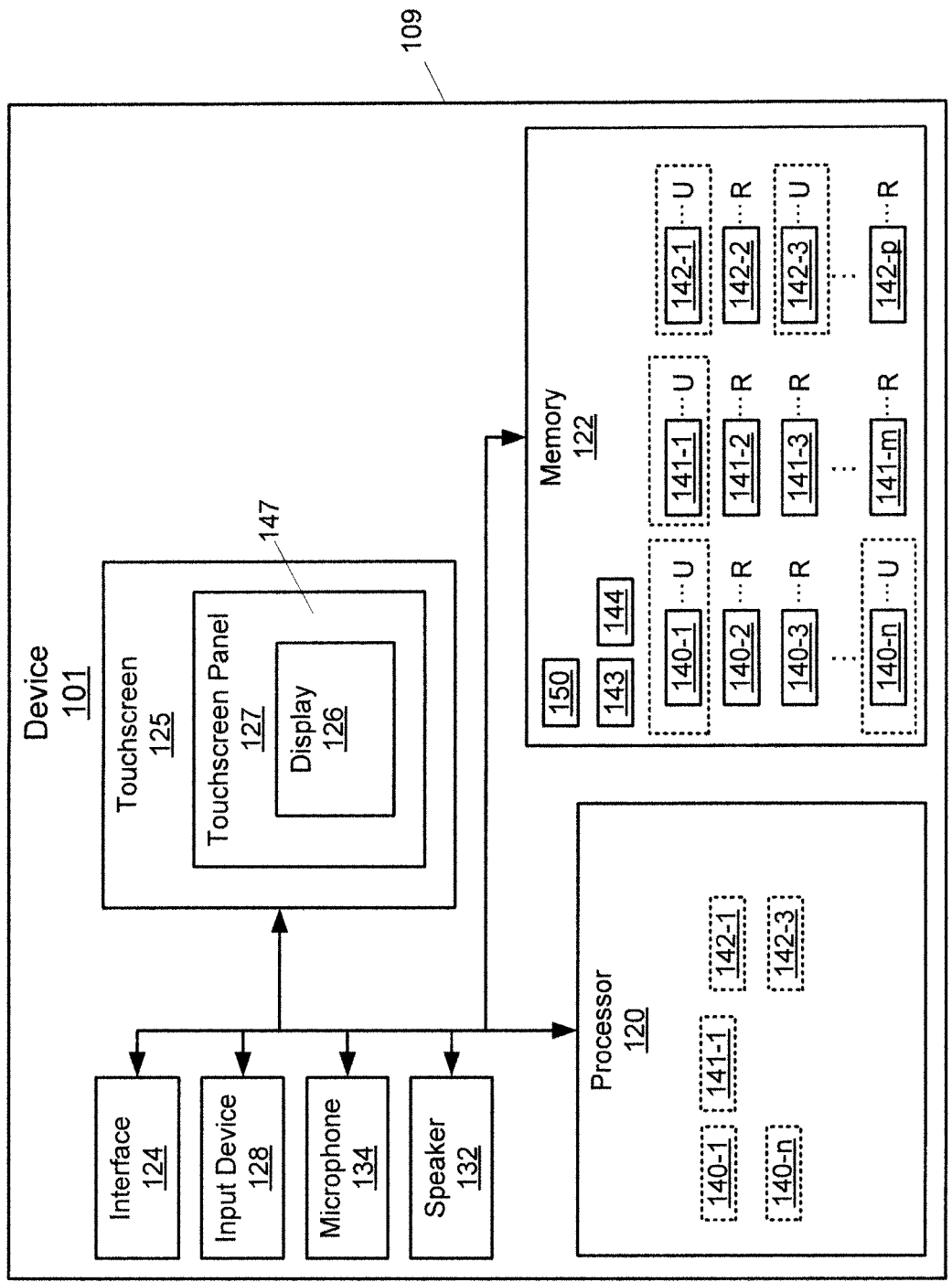

FIG. 24 depicts the device of FIG. 1, and a processor thereof, applying a second filtering condition, associated with the second portion of the sliding touch input to messages stored therein, in response to receiving the second portion of FIG. 22 and/or FIG. 23, according to non-limiting implementations.

Figure 25:
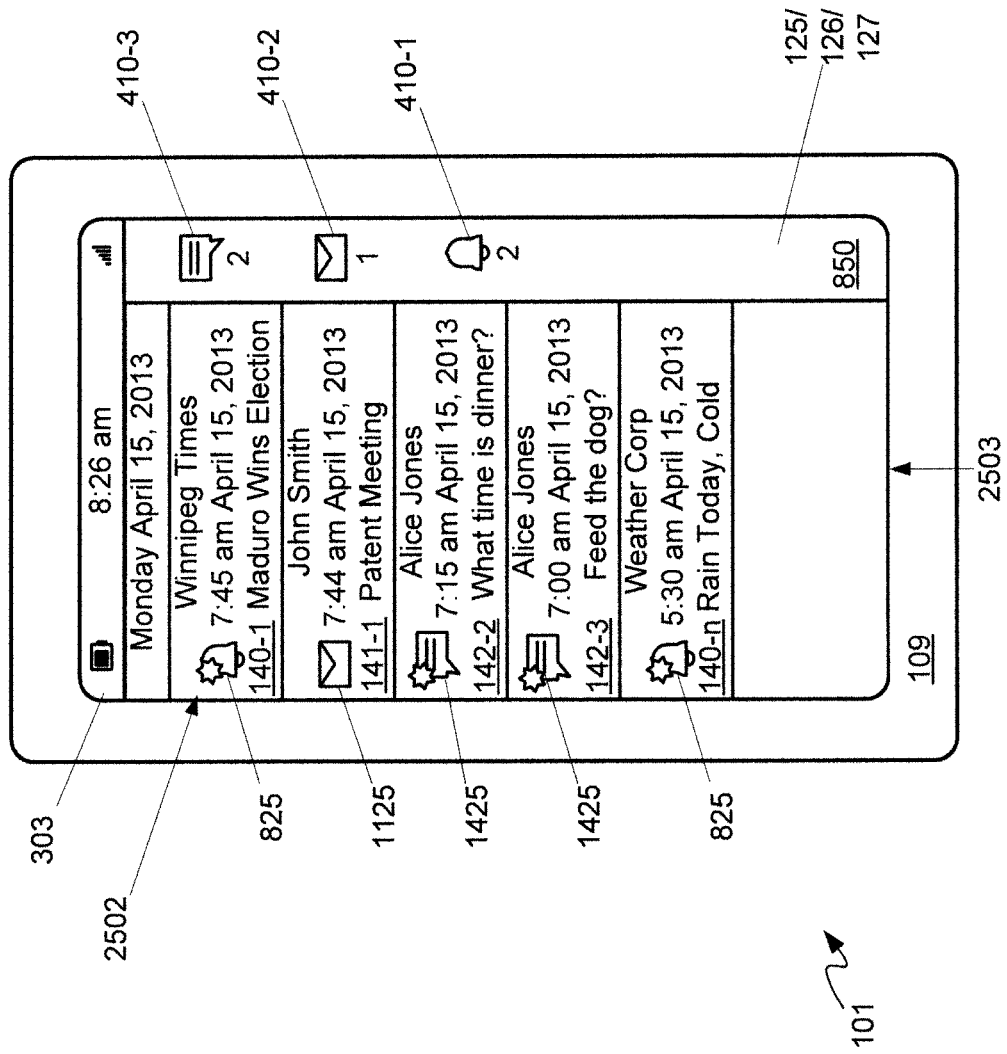

FIG. 25 depicts a perspective view of the device of FIG. 1 showing a resulting GUI of a list of selected messages after the second filtering condition of FIG. 24 is applied, according to non-limiting implementations.

Figure 26:
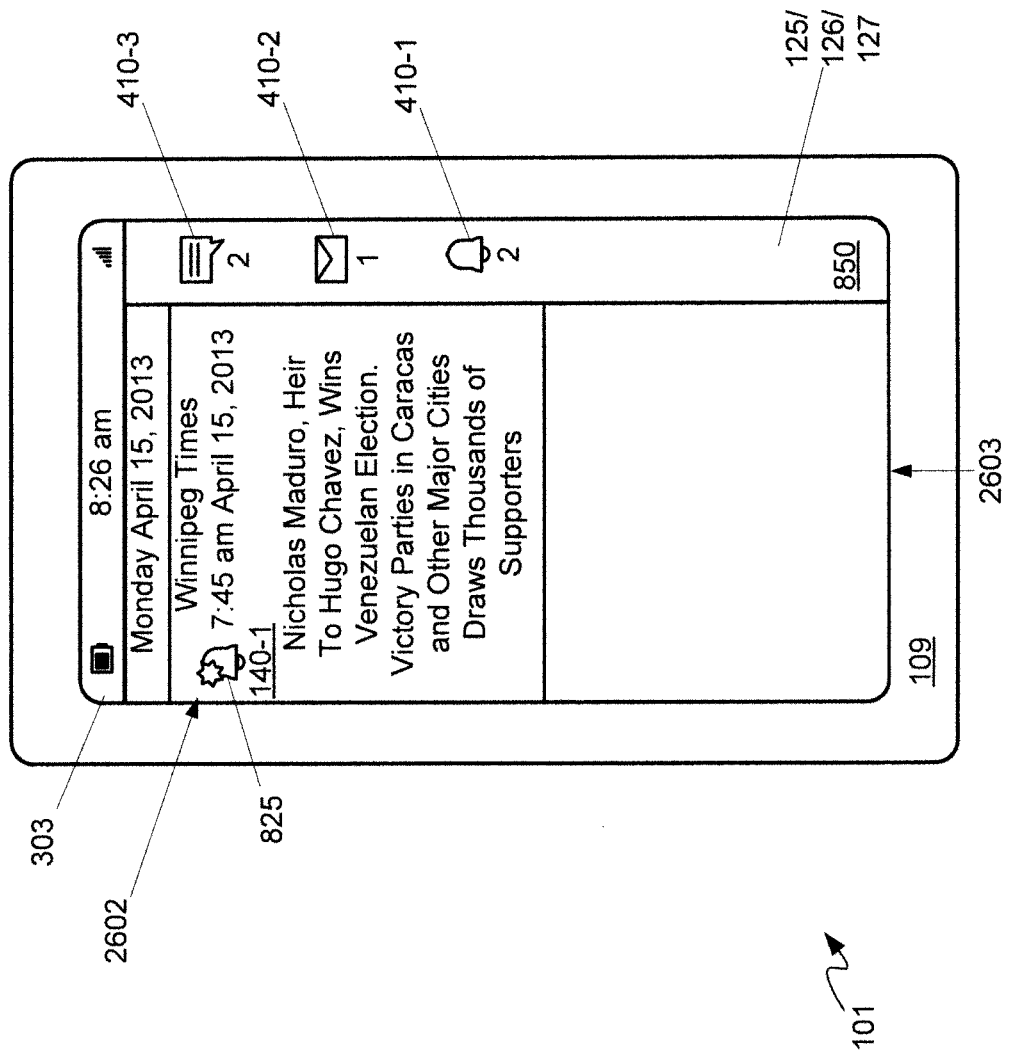

FIG. 26 depicts a perspective view of the device of FIG. 1 showing a resulting alternate GUI of a most recent unread message after a second filtering condition is applied, according to non-limiting implementations.

DETAILED DESCRIPTION

In general, this disclosure is directed to a device, and in particular a mobile electronic device, with a touchscreen, that can receive and provide messages, at the touchscreen. In general, mobile electronic devices represent electronic devices that are readily movable from place to place. Further such mobile electronic devices are often operated with one hand in busy environments. When such devices receive messages, it is desirable to filter the messages according to a given type and/or according to read status, for example to access only unread messages; however filtering messages can be challenging on many devices. For example, a filter can be manually applied by adjusting a setting in a mail application using a pull down menu or the like, and/or by navigating to messages of a given type and/or unread messages by actuating a series of navigation buttons. However, such operations can be finicky using one-handed operation, and are prone to error, and/or can require two-handed operation and/or require that adjustments be made to the device that may have to be changed later so that all messages can be viewed. This specification hence describes various implementations of a device that can easily, and ergonomically, navigate to messages of a given type and/or unread messages using one-handed gestures at a touchscreen.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

In this specification, elements, such as a processor, may be described as "providing", at a display, given items, such that a display device displays a representation of those items. In general, a display and/or a display device comprises image forming apparatus and circuitry for controlling the image forming apparatus. Hence, in general, an element that "provides" an item at a display communicates with the circuitry which, in turn, controls the image forming apparatus to provide a representation of the item, for example by turning pixels of the image forming apparatus on and off, based on data and/or frame data and/or commands received at the circuitry from the element, such as a processor. Thus, when an element, such as a processor, is described as providing, at a display, a given item, a series of technical effects and/or steps occur; as such, providing a given item at a display is not to be interpreted as simply displaying information. Further, when a processor, for example, provides a given item, at a display, a physical state of a device is changed and/or modified and/or transformed.

An aspect of the specification provides a device comprising: a processor; a memory storing messages of different types, at least a subset of the messages designated as unread messages; and a touchscreen including a display; the processor configured to: detect a sliding touch input at the touchscreen, the sliding touch input comprising a first portion in a first direction and a second portion in a second direction such that the sliding touch input includes a change in direction; and, in response, filter the messages according to one or more of a first filtering condition associated with the first portion and a second filtering condition associated with the second portion, to filter the messages according to one or more of type and a read status.

The processor can be further configured to filter the messages according to the type using the first filtering condition by: determining a length of the first portion; and, in response to determining the length of the first portion, filtering the messages according to the type on a basis of the length of the first portion, wherein a given length of the first portion is associated with one or more given types of the messages.

The processor can be further configured to filter the messages according to the type using the first filtering condition by: determining an area of the change in direction at the touchscreen; and, in response, filtering the messages according to the type on a basis of the area, wherein a given area of the touchscreen is associated with one or more given types of the messages.

The processor can be further configured to filter the messages according to the type using the first filtering condition by: providing, at the display, indicators associated with types of the messages; determining that an area of the change in direction at the touchscreen includes a given indicator associated with a given type of the messages; and, in response, filtering the messages according to the given type. The processor can be further configured to change the given indicator, at the display, when a current touch input of the first portion is in the area including the given indicator.

The processor can be further configured to filter the messages according to the type using the first filtering condition by: determining one or more of: a length of the first portion does not terminate in any of areas of the touchscreen associated with any of the types of the messages; the change in direction at the touchscreen does not occur in any of the areas; and an area of the change in direction does not include a given indicator associated with any of the types of the messages; and, in response, one or more of: filtering the messages to include all the types of the messages; and, filtering the messages according to a given previous filtering condition.

The processor can be further configured to filter the messages according to the read status using the second filtering condition by: determining that the second portion is received within a threshold time period; and, in response, filtering the messages according to the read status so that that only one or more of the unread messages remain.

The processor can be further configured to filter the messages according to the read status using the second filtering condition by: determining that the second portion includes one or more of: touch input at a bezel portion of the touchscreen, and static touch input greater than or equal to a given time period; and, in response, filtering the messages according to the read status so that that only one or more of the unread messages remain.

The processor can be further configured to filter the messages according to the read status using the second filtering condition by selecting only a most recent unread message.

The processor can be further configured to filter the messages according to the read status using the second filtering condition by selecting only a most recent unread message of a given type, the given type selected based on one or more of: a length of the first portion, an area of the change in direction at the touchscreen, and determining that the area of the change in direction at the touchscreen includes a given indicator associated with the given type.

Another aspect of the specification provides a method comprising: at a device comprising: a processor; a memory storing messages of different types, at least a subset of the messages designated as unread messages; and a touchscreen including a display, detecting, using the processor, a sliding touch input at the touchscreen, the sliding touch input comprising a first portion in a first direction and a second portion in a second direction such that the sliding touch input includes a change in direction; and, in response, filtering the messages at the processor according to one or more of a first filtering condition associated with the first portion and a second filtering condition associated with the second portion, to filter the messages according to one or more of type and a read status.

Filtering the messages according to the type using the first filtering condition can comprise: determining a length of the first portion; and, in response to determining the length of the first portion, filtering the messages according to the type on a basis of the length of the first portion, wherein a given length of the first portion is associated with one or more given types of the messages.

Filtering the messages according to the type using the first filtering condition can comprise: determining an area of the change in direction at the touchscreen; and, in response, filtering the messages according to the type on a basis of the area, wherein a given area of the touchscreen is associated with one or more given types of the messages.

Filtering the messages according to the type using the first filtering condition can comprise: providing, at the display, indicators associated with types of the messages; determining that an area of the change in direction at the touchscreen includes a given indicator associated with a given type of the messages; and, in response, filtering the messages according to the given type.

Filtering the messages according to the type using the first filtering condition can comprise: determining one or more of: a length of the first portion does not terminate in any of areas of the touchscreen associated with any of the types of the messages; the change in direction at the touchscreen does not occur in any of the areas; and an area of the change in direction does not include a given indicator associated with any of the types of the messages; and, in response, one or more of: filtering the messages to include all the types of the messages; and, filtering the messages according to a given previous filtering condition.

Filtering the messages according to the read status using the second filtering condition can comprise: determining that the second portion is received within a threshold time period; and, in response, filtering the messages according to the read status so that only one or more of the unread messages remain.

Filtering the messages according to the read status using the second filtering condition can comprise: determining that the second portion includes one or more of: touch input at a bezel portion of the touchscreen, and static touch input greater than or equal to a given time period; and, in response, filtering the messages according to the read status so that only one or more of the unread messages remain.

Filtering the messages according to the read status using the second filtering condition can comprise selecting only a most recent unread message.

Filtering the messages according to the read status using the second filtering condition can comprise selecting only a most recent unread message of a given type, the given type selected based on one or more of: a length of the first portion, an area of the change in direction at the touchscreen, and determining that the area of the change in direction at the touchscreen includes a given indicator associated with the given type.

Yet a further aspect of the specification provides a computer program product, comprising a computer usable medium having a computer readable program code adapted to be executed to implement a method comprising: at a device comprising: a processor; a memory storing messages of different types, at least a subset of the messages designated as unread messages; and a touchscreen including a display, detecting, using the processor, a sliding touch input at the touchscreen, the sliding touch input comprising a first portion in a first direction and a second portion in a second direction such that the sliding touch input includes a change in direction; and, in response, filtering the messages at the processor according to one or more of a first filtering condition associated with the first portion and a second filtering condition associated with the second portion, to filter the messages according to one or more of type and a read status. The computer usable medium can comprise a non-transitory computer usable medium.

FIG. 1 depicts a schematic diagram of a mobile electronic device 101, referred to interchangeably hereafter as device 101, according to non-limiting implementations. Device 101 comprises a housing 109, a processor 120, a memory 122, a communication interface 124, a touchscreen 125 that includes a display 126 and a touchscreen panel 127, at least one optional input device 128, an optional speaker 132 and an optional microphone 134.

In particular, memory 122 stores messages 140-1, 140-2, 140-3 ... 140-n, 141-1, 141-2, 141-3 ... 141-m, 142-1, 142-2, 142-3 ... 142-p of different types. Messages 140-1, 140-2, 140-3 ... 140-n, 141-1, 141-2, 141-3 ... 141-m, 142-1, 142-2, 142-3 ... 142-p are interchangeably referred to hereafter, collectively, as messages 140, 141, 142 and generically as a message 140 and/or a message 141 and/or a message 142 and/or a message 140, 141, 142. Each of messages 140, 141, 142 can include, but is not limited to, one or more of an email message, a text message, a short message service (SMS) message, a multimedia message service (MMS) message, social networking message, a notification message (e.g. including, but not limited to, notifications of telephone calls, voice messages, software updates etc.) and the like.

Further, messages 140, 141, 142 are generally of different types of messages and/or are categorized and/or are of different categories of messages. Specifically, messages 140 are messages of a first type, messages 141 are messages of a second type, different from the first type, and messages 142 are messages of a third type, different from the first type and the second type. In general, messages 140, 141, 142 are categorized according to one or more of a type of service from which messages 140, 141, 142 were received and/or according to a type of message application for viewing and/or receiving respective messages 140, 141, 142, and/or a format of a message 140, 141, 142. For example, each message 140 can comprise a notification message, each message 141 can comprise an email message and each message 142 can comprise a text message. However, other types of messages are within the scope of present implementations, including, but not limited to SMS messages, MMS messages, social networking messages and the like.

In some implementations, each message 140, 141, 142 is associated with a read status such that each message is designated as an unread messages or a read message. In other words, at least a subset of messages 140, 141, 142 is designated as unread messages, while another subset is designated as read messages. In FIG. 1, each of messages 140, 141, 142 are designated as unread or read, at memory 122, respectively using a "U" and an "R"; however, such a convention is merely for example purposes only and any process and/or method and/or means and/or designator can be used to designate messages 140, 141, 142 as unread or read; indeed, messages 140, 141, 142 can be stored in a database at memory 122, and database conventions can be used to designate messages 140, 141, 142 as unread or read. Further, while number "n" of messages 140, a number "m" of messages 141, and a number "p" of messages 142 are depicted in FIG. 1, any number of each of messages 140, 141, 142 that can be stored at memory 122 is within the scope of present implementation.

Memory 122 further stores a first filtering condition 143 and a second filtering condition 144, each of which define conditions under which messages 140, 141, 142 can be filtered, for example according to type and/or according to read status. First filtering condition 143 is generally associated with a first portion of sliding touch input at touchscreen 125 and second filtering condition 144 is generally associated with a second portion of the sliding touch input at touchscreen 125. In other words, first filtering condition 143 can be applied to messages 140, 141, 142 when a first portion of sliding touch input meets first given criteria, and second filtering condition 144 can be applied to messages 140, 141, 142 when a second portion of the sliding touch input meets second given criteria, as described hereafter. In general the first given criteria define conditions under which given types of messages 140, 141, 142 are filtered, while the second given criteria define conditions under which unread messages 140, 141, 142 are filtered.

In order to filter messages 140, 141, 142 according to one or more of type and read status, and as will be described hereafter, processor 120 is generally configured to: detect a sliding touch input at touchscreen 125, the sliding touch input comprising a first portion in a first direction and a second portion in a second direction such that the sliding touch input includes a change in direction; and, in response, filter the messages 140, 141, 142 according to one or more of first filtering condition 143 associated with the first portion and second filtering condition 144 associated with the second portion to filter the messages according to one or more of type and a read status.

Device 101 can be any type of electronic device that can be used in a self-contained manner to implement messaging functions, including sending and receiving messages using the communication interface 124 and, in particular, filter messages 140, 141, 142 according to one or more of type and read status.

Device 101 includes, but is not limited to, any suitable combination of electronic devices, communications devices, computing devices, personal computers, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

It should be emphasized that the structure of device 101 in FIG. 1 is purely an example, and contemplates a device that can be used for both wireless voice (e.g. telephony) and wireless data communications (e.g. email, web browsing, text, and the like). However, FIG. 1 contemplates a device that can be used for any suitable specialized functions, including, but not limited to, one or more of, messaging, telephony, computing, appliance, and/or entertainment related functions.

Housing 109 can comprise any housing, casing, and the like. It is appreciated that device 101 can be portable (readily movable from place to place) and, in some implementations, device 101 can be handheld (sized and shaped to be held or carried in a human hand, and typically used while so held or carried); hence, housing 109 can be configured for a corresponding type of device 101. In general, housing 109 encloses or houses the components of device 101, such as processor 120, memory 122, communication interface 124, etc.; however some components can be visible via apertures, windows and the like in housing 109. For example, display 126 is generally visible, and touchscreen panel 127 is generally accessible for touching, for example by a finger of a user.

Touchscreen 125 comprises display 126 and touchscreen panel 127. Display 126 comprises any suitable one of or combination of CRT (cathode ray tube) and/or flat panel displays (e.g. LCD (liquid crystal display), plasma, OLED (organic light emitting diode), and the like). Touchscreen panel 127 includes but is not limited to a capacitive touchscreen panel, a resistive touchscreen panel, and the like. Touchscreen 125, and, in particular, touchscreen panel 127, is generally configured to receive input data, and, in particular, touch input data. Touch input data can comprise one or more of sliding touch input and static touch input. For example, sliding touch input can comprise data detected at touchscreen panel 127 that corresponds to a series of touch inputs at touchscreen panel 127 in adjacent portions of touchscreen panel 127 that represent continuous touching actuation thereof in a sliding motion; while each touch input in the sliding touch input can be discrete, depending on how often touchscreen panel is sampled by processor 120, the series of touch inputs is recognized by processor 120 as sliding touch input.

Similarly, a static touch input can comprise a series of touch inputs at touchscreen panel 127 that are all generally in a same area of touchscreen panel 127 that represent continuous touching actuation thereof without substantial movement; while each touch input in the static touch input can be discrete, depending on how often touchscreen panel is sampled by processor 120, the series of touch inputs is recognized by processor 120 as a static touch input.

Processor 120 is generally configured to distinguish between a sliding touch input and a static touch input: for example, processor 120 can be configured to determine that, when a touch input is detected within a given area for a given period of time, the touch input is a static touch input, the given area and given period of time being predetermined and stored at memory 122; the given area and given period of time can be determined by one or more of experimentally, heuristically, trial and error, using user interface design software and the like.

Display 126 and touchscreen panel 127 are generally aligned such that areas of display 126, where actuatable and/or activatable and/or selectable controls and/or items are displayed, correspond to areas of touchscreen panel 127 where touch input can be received to actuate and/or activate and/or select the corresponding controls and/or items. While each of display 126 and touchscreen panel 127 can be provided separately, when integrated into device 101 as touchscreen 125, they generally work in tandem using processor 120 which controls display 126 to provide actuatable and/or activatable and/or selectable controls and/or items, and receives touch input data from touchscreen panel 127: processor 120 can determine whether an area of the touch input corresponds to the area of the display where the actuatable and/or activatable and/or selectable controls and/or items are located and control display 126, and device 101, accordingly.

Furthermore, an area of touchscreen panel 127 can be larger than an area of display 126 so that touch input can be received at a location of touchscreen panel 127 that does not correspond to an area of display 126; for example, in these implementations, touchscreen panel 127 can extend to a bezel of display 126 so that touch input can be received at the bezel. As such, touchscreen panel 127, and hence touchscreen 125, includes a bezel portion 147 where touch input can be received at a bezel of display 126. Processor 120 can hence be further configured to determine when touch input is received at touchscreen panel 127 at a location that corresponds to an area of display 126, and when touch input is received at touchscreen panel 127 at a location that corresponds to bezel portion 147.

In some implementations, device 101 further comprises at least one optional input device 128, in addition to touchscreen 125, the at least one input device 128 is generally configured to receive input data, and can comprise any suitable combination of input devices, including but not limited to a keyboard, a keypad, a pointing device, a mouse, a track wheel, a trackball, a touchpad, a touchscreen and the like. Other suitable input devices are within the scope of present implementations.

In any event, input from touchscreen 125 (e.g. touchscreen panel 127), and/or optional at least one input device 128, is received at processor 120, which can be implemented as a plurality of processors, including but not limited to one or more central processors (CPUs).

Processor 120 is configured to communicate with a memory 122 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 101 as described herein are typically maintained, persistently, in memory 122 and used by processor 120 which makes appropriate utilization of volatile storage during the execution of such programming instructions. Those skilled in the art will now recognize that memory 122 is an example of computer readable media that can store programming instructions executable on processor 120. Furthermore, memory 122 is also an example of a memory unit and/or memory module.

In particular, memory 122 stores at least one application 150, that, when processed by processor 120, enables processor 120 to: detect a sliding touch input at touchscreen 125, the sliding touch input comprising a first portion in a first direction and a second portion in a second direction such that the sliding touch input includes a change in direction; and, filter messages 140, 141, 142 according to one or more of first filtering condition 143 associated with the first portion and second filtering condition 144 associated with the second portion to filter the messages according to one or more of type and a read status.

At least one application 150 is an example of programming instructions stored at memory 122. For example, at least one application 150 can comprise a combination of a messaging application a filtering application for filtering messages 140, 141, 142, depending on touch input received at touchscreen 125. In some implementations the messaging application and the filtering application can be combined, while in other implementations the messaging application and the filtering application are distinct from one another. Similarly, in some implementations, filtering conditions 143, 144 can be stored separately from application 150 (as depicted) while, in other implementations, filtering conditions 143, 144 can be combined with application 150.

Processor 120 can be further configured to communicate with optional microphone 134 and speaker 132. Microphone 134 comprises any suitable microphone for receiving sound and converting to audio data. Speaker 132 comprises any suitable speaker for converting audio data to sound to provide one or more of audible alerts, audible communications from remote communication devices, and the like. In some implementations, one or more of input device 128 and touchscreen 125 are external to device 101, with processor 120 in communication with each of input device 128 and/or touchscreen 125 via a suitable connection and/or link.

Processor 120 also connects to communication interface 124 (interchangeably referred to as interface 124), which can be implemented as one or more radios and/or connectors and/or network adaptors, configured to wirelessly communicate with one or more communication networks (not depicted), for example via one or more antennas (not depicted). It will be appreciated that interface 124 is configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+) such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth™ links, NFC (near field communication) links, WLAN (wireless local area network) links, WiFi links, WiMax links, packet based links, the Internet, analog networks, the PSTN (public switched telephone network), access points, and the like, and/or a combination.

Specifically, interface 124 comprises radio equipment (i.e. a radio transmitter and/or radio receiver) for receiving and/or transmitting signals and/or messages 140, 141, 142. Indeed, in FIG. 1, it is assumed that messages 140, 141, 142 were previously received at device 101 via interface 124 and stored at memory 122.

Device 101 further comprises a power source, not depicted, for example a battery or the like. In some implementations the power source can comprise a connection to a mains power supply and a power adaptor (e.g. an AC-to-DC (alternating current to direct current) adaptor).

In any event, it should be understood that a wide variety of configurations for device 101 are contemplated.

Figure 2:
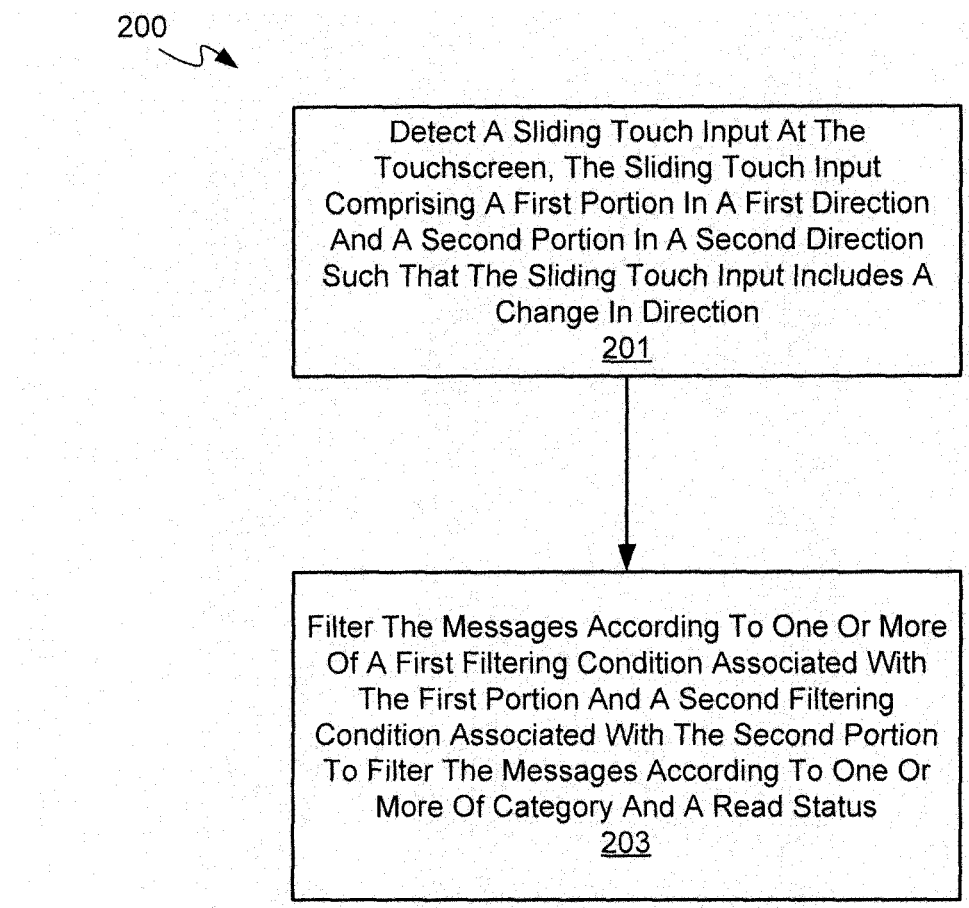
FIG. 2 depicts a block diagram of a flowchart of a method for filtering messages, according to non-limiting implementations.

Attention is now directed to FIG. 2 which depicts a flowchart illustrating a method 200 for filtering messages, according to non-limiting implementations. In order to assist in the explanation of method 200, it will be assumed that method 200 is performed using device 101. Furthermore, the following discussion of method 200 will lead to a further understanding of device 101 and its various components. However, it is to be understood that device 101 and/or method 200 can be varied, and need not work exactly as discussed herein in conjunction with each other, and that such variations are within the scope of present implementations. It is appreciated that, in some implementations, method 200 is implemented in device 101 by processor 120, for example by implementing application 150.

It is to be emphasized, however, that method 200 need not be performed in the exact sequence as shown, unless otherwise indicated; and likewise various blocks may be performed in parallel rather than in sequence; hence the elements of method 200 are referred to herein as "blocks" rather than "steps". It is also to be understood that method 200 can be implemented on variations of device 101 as well.

At block 201, processor 120 detects a sliding touch input at touchscreen 125, the sliding touch input comprising a first portion in a first direction and a second portion in a second direction such that the sliding touch input includes a change in direction, for example due to a finger of a user (including, but not limited to, a thumb of the user) sliding on touchscreen 125. For example, processor 120 is further enabled to determine and/or detect whether sliding touch input received at touch screen includes a change in direction, for example due to the finger of the user first sliding in a first direction on touchscreen 125 and then sliding in a second direction on touchscreen 125, in a continuous motion without the finger leaving the touchscreen. In other words, the finger maintains contact with touchscreen 125 while the sliding touch input is being received.

At block 203, in response to block 201, processor 120 filters messages 140, 141, 142 according to one or more of first filtering condition 143 associated with the first portion and a second filtering condition 144 associated with the second portion to filter the messages according to one or more of type and a read status Method 200 is now described with reference to FIGS. 3 to 26, each of FIGS. 3 to 6, 8, 9, 11, 12, 14, 15, 17 to 19, 21 to 23, 25, and 26 depicting a front perspective view of device 101, including touchscreen 125, display 126 and touchscreen panel 127 (i.e. display 126 is visible through touchscreen panel 127); further, each of FIGS. 3 to 6, 8, 9, 11, 12, 14, 15, 17 to 19, 21 to 23, 25, and 26 depict graphic user interfaces (GUI) provided at display 126 when circuitry at display 126 is controlled by processor 120 to provide representations of messages 140, 141, 142 and/or representations of other data. Further, each of FIGS. 3 to 6, 8, 9, 11, 12, 14, 15, 17 to 19, 21 to 23, 25 and 26 are substantially similar, with like elements having like numbers. Each of FIGS. 7, 10, 13, 16, 20 and 24 are substantially similar to FIG. 1, with like figures having like numbers.

Figure 3:
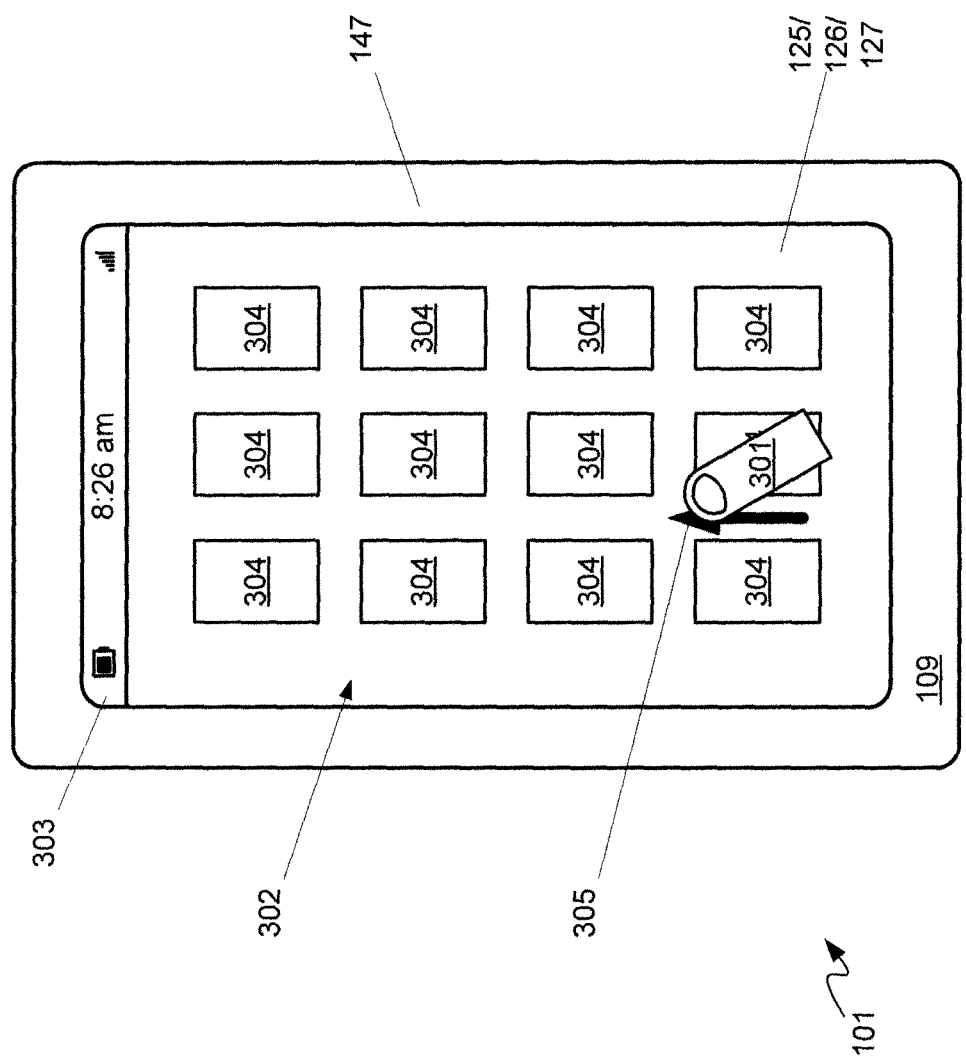
FIG. 3 depicts a perspective view of the device of FIG. 1, showing a Graphic User Interface (GUI) for filtering messages, and a first portion of sliding touch input being received at the device, according to non-limiting implementations.

Hence, attention is directed to FIG. 3 which depicts a finger 301 (including, but not limited to, a thumb of a user) interacting with touchscreen 125, as display 126 is controlled to provide a GUI 302. While most of finger 301 is depicted, generally only a tip of finger 301 will touch touchscreen 125. FIG. 3 also indicates a location of bezel portion 147, adjacent to, but outside of, display 126.

GUI 302 includes an optional status area 303 located in a "top" and/or header region of GUI 302, the status area 303 including icons and/or indicators of states of various electronic components of device 101, as well as a time of day; for example, as depicted, status area 303 includes a battery indicator and a network indicator. However, a location and content of status area 303 is not to be considered particularly limiting.

GUI 302 further, optionally, includes icons 304, each of which correspond to one or more applications stored at memory 122; a given icon 304 can be designated as selected when static touch input is received at touchscreen panel 127 in an area corresponding to a location of the given icon 304 at display 126; the corresponding application can then be processed by processor 120 and/or "launched".

In general, touchscreen 125 can receive sliding touch input when finger 301 slides on touchscreen 125, for example in a direction of arrow 305: in other words, arrow 305 corresponds to various positions of finger 301 as finger 301 slides on touchscreen 125. Further, processor 120 can detect a corresponding sliding touch input corresponding to finger 301 sliding on touchscreen 125 in direction of arrow 305; indeed, arrow 305 indicates a position of finger 301 at various locations on touchscreen 125 while the sliding touch input is being received. Hence, sliding touch input is received along arrow 305, and arrow 305 is representative of the sliding touch input.

Figure 4:
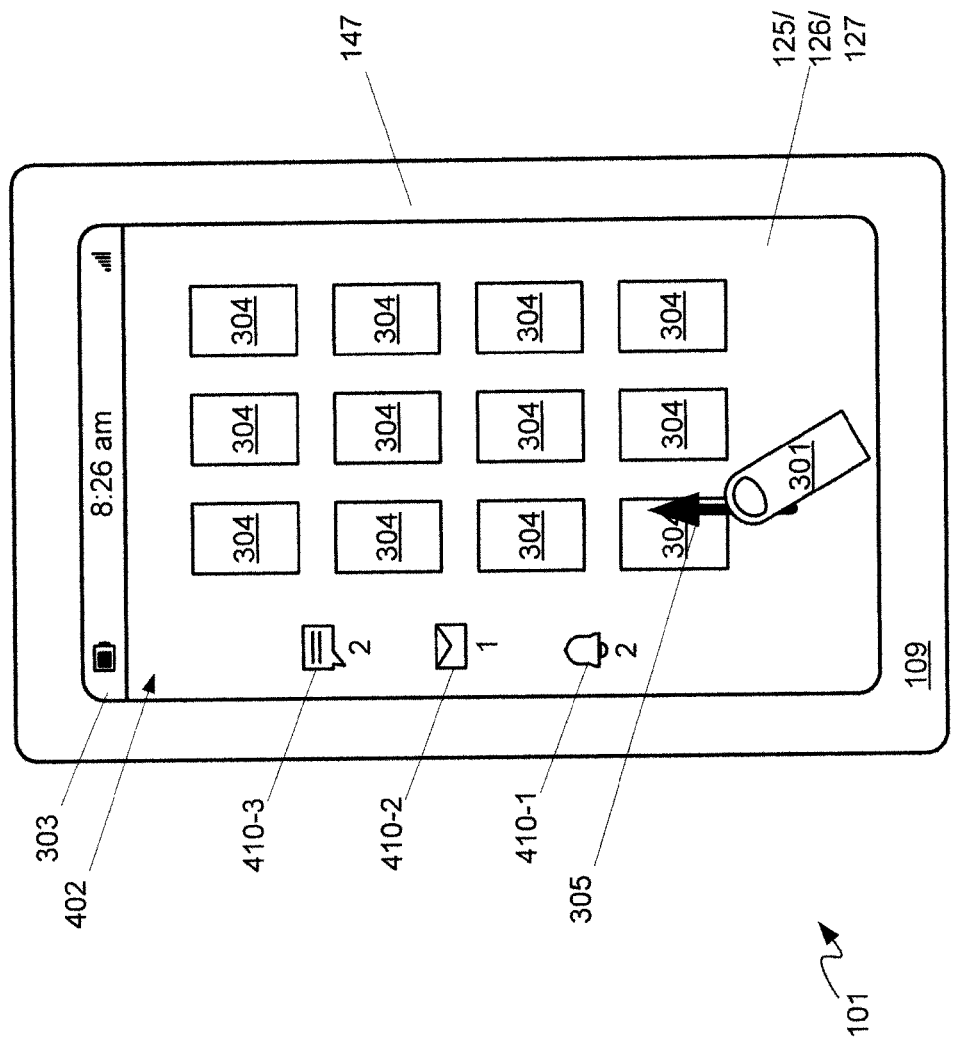
FIG. 4 depicts a perspective view of the device of FIG. 1, showing a GUI for filtering messages after the first portion of the sliding touch input is received, according to non-limiting implementations.

In response to detecting finger 301 sliding on touchscreen 125, as depicted in FIG. 4, processor 120 changes GUI 302 to GUI 402, for example using animation and the like. In particular, each icon 304, when present, can optionally shrink/become smaller, to make room for indicators 410-1, 410-2, 410-3, which are provided at an edge of touchscreen 125. Indicators 410-1, 410-2, 410-3 will be interchangeably referred to hereafter, collectively, as indicators 410 and generically as an indicator 410. Indicators 410 are generally appreciated to be optional, but can provide a visual guide for locations of various areas of touchscreen 125 associated with different types of messages 140, 141, 142, as described below.

Indicators 410 generally indicate whether any messages 140, 141, 142 are both stored at memory 122 and designated as unread messages. When messages 140, 141, 142 that are designated as unread are stored at memory 122, one or more indicators 410 are provided; otherwise indicators 410 are not provided. Optionally, as depicted, each indicator 410 can provide a number of messages 140, 141, 142 designated as unread stored at memory 122.

Furthermore, each indicator 410 can be indicative of whether unread messages 140 of a given respective type are stored at memory 122 and/or a number of unread messages 140, 141, 142 of a given respective type. For example an indicator 410-1 comprises a graphical icon indicating that there are unread notification messages 140 at memory 122; as depicted, indicator 410-1 also comprises a number of notification messages 140 designated as unread messages. Similarly, an indicator 410-2 comprises a graphical icon indicating that there are unread email messages 141 at memory 122; as depicted, indicator 410-2 also comprises a number of email messages 141 designated as unread messages. Similarly, an indicator 410-3 comprises a graphical icon indicating that there are unread text messages 142 at memory 122; as depicted, indicator 410-3 also comprises a number of text messages designated as unread messages.

Further, while indicators 410 are depicted as being in a particular order and in particular locations (e.g. with indicator 410-1 below indicator 410-2, which is below indicator 410-3, and with indicators on left hand side of display 126), other orders and locations of indicators 410 are within the scope of present implementations. However, in general, indicators 410 are generally provided on display 126 along a direction of sliding touch input represented by arrow 305.

The terms "top", "above", "up", "bottom", "below, "down", as used herein, are understood to be relative to touchscreen 125 and/or display 126, and are not meant to be relative to the ground. For example, device 101 can be held horizontally and/or upside down, and such reference to portions of touchscreen 125, and/or display 126 that are "up" or "down" and the like will not change. However, in some implementations, an orientation of data provided at display 126 can change, and hence, in these implementations, the terms "'top", "above", "up", "bottom", "below, "down" are understood to be relative to the orientation of data provided at display 126

Figure 5:
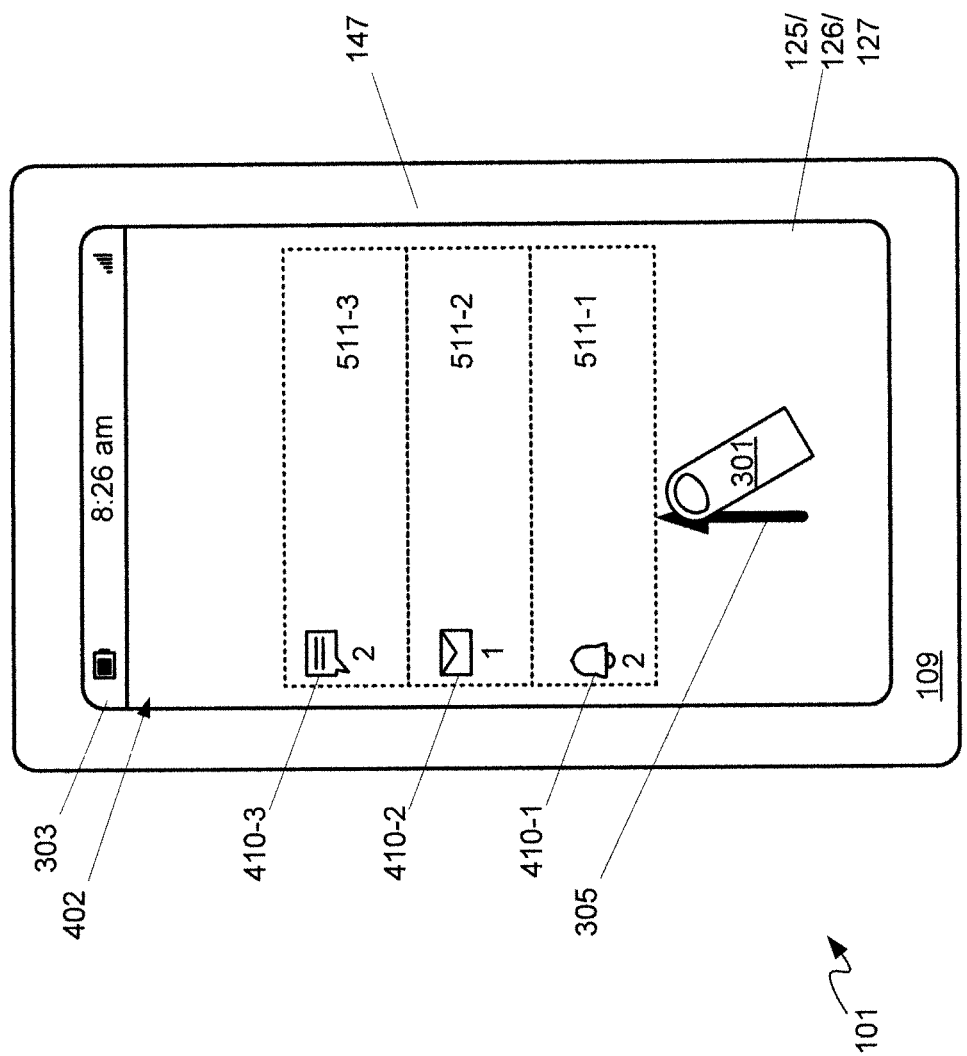
FIG. 5 depicts a perspective view of the device of FIG. 1, and a simplified view of the GUI of FIG. 4, as well as areas of a touchscreen associated with different message types, according to non-limiting implementations.

Attention is next directed to FIG. 5, which is substantially similar to FIG. 4, with like elements having like numbers; however, FIG. 5 depicts a simplified view of GUI 402, without icons 304. FIG. 5 also depicts areas 511-1, 511-2, 511-3 of touchscreen 125. Areas 511-1, 511-2, 511-3 are interchangeably referred to hereafter, collectively, as areas 511 and generically as an area 511.

Each of areas 511 are generally associated with one or more of a respective message type and a respective indicator 410; in other words, processor 120 is enabled to both provide indicators at display 126, and associate each of areas 511 with one or more of a respective type of messages 140, 141, 142 and a respective indicator 410. For example, as depicted: area 511-1 is associated with notification messages 140, as is associated indicator 410-1; area 511-2 is associated with email messages 141, as is associated indicator 410-2; and area 511-3 is associated with text messages 142, as is associated indicator 410-3.

Each area 511 can extend from a first side of touchscreen 125 to an opposite side of touchscreen 125, in a direction generally perpendicular to a layout of indicators 410 and/or a direction of sliding touch input represented by arrow 305. Alternatively, and as depicted, each area 511 can extend from adjacent a first side of touchscreen 125 to adjacent an opposite side of touchscreen 125, in a direction generally perpendicular to a layout of indicators 410 and/or a direction of sliding touch input represented by arrow 305.

Further a given area 511 can share a border, which intersects with a direction of sliding touch input represented by arrow 305, with an adjacent area 511; however, gaps between areas 511 are also within the scope of present implementations.

As depicted, arrow 305 is below area 511-1, indicating that finger 301 has not yet reached areas 511. FIG. 5 also illustrates that, in general, sliding touch input represented by arrow 305 starts proximal a bottom of touchscreen 125 and beneath areas 511. However, while the sliding touch input represented by arrow 305 begins approximately midway between a left edge and a right edge of touchscreen 125, the sliding touch input represented by arrow 305 can begin anywhere below areas 511 that allow a second portion of the sliding touch input to be received, as described hereafter.

Figure 6:
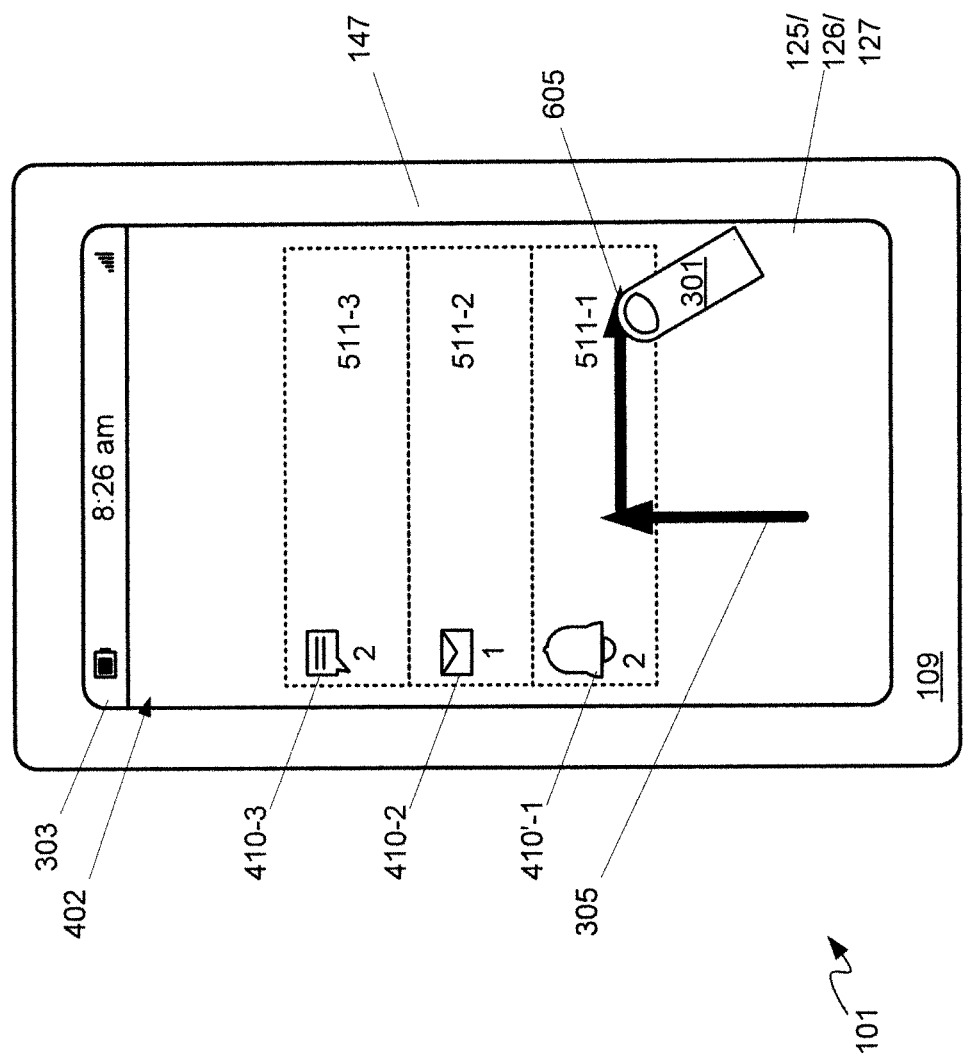
FIG. 6 depicts a perspective view of the device of FIG. 1, showing the simplified GUI of FIG. 5, and a second portion of sliding touch input being received at the device, according to non-limiting implementations.

Attention is next directed to FIG. 6, which depicts device 101 after finger 301 has moved further up touchscreen 125, relative to FIG. 5, and changed direction in a generally continuous motion without finger 301 leaving touchscreen 125, though pauses in movement of finger 301 are within the scope of present implementations, including, but not limited to, a slight pause when finger 301 changes direction. In other words, the finger maintains contact with touchscreen 125 while the sliding touch input is being received. Hence, arrow 305 extends into area 511-1, and finger 301 has moved into area 511-1 on touchscreen 125. FIG. 6 also shows that finger 301 changed direction during the sliding touch input, as indicated by arrow 605.

Further, processor 120 can detect a corresponding sliding touch input corresponding to finger 301 sliding on touchscreen 125 in direction of arrow 605; indeed, arrows 305, 605 each indicate a position of finger 301 at various locations on touchscreen 125 while the sliding touch input is being received. Furthermore, arrows 305, 605 also indicate that processor 120 determines that sliding touch input includes a change in direction. Specifically, arrow 305 is representative of a first portion of a sliding touch input, the first portion in a first direction indicated by arrow 305, and arrow 605 is representative of a second portion of a sliding touch input, the second portion in a second direction indicated by arrow 605, the second direction different from the first direction, for example the second direction is towards a side of touchscreen 125 opposite indicators 410, and/or the second direction is about perpendicular to the first direction. In general, the sliding touch input is received without finger 301 being removed from touchscreen 125.

In general, processor 120 detects a sliding touch input, represented by arrows 305, 605, at touchscreen 125, the sliding touch input comprising a first portion in a first direction (represented by arrow 305) and a second portion in a second direction (represented by arrow 605) such that the sliding touch input includes a change in direction (i.e. block 201 of method 200).

In some implementations, as depicted, processor 120 is further configured to change a given indicator 410, at display 126, when a current touch input of the first portion is in an area 511 that includes the given indicator 410. For example, in FIG. 6, indicator 410-1 has changed to indicator 410'-1, as compared to FIG. 5, indicating that notification messages 140 can be selected and/or filtered when a second portion of the sliding touch input occurs in area 511-1. In particular, indicator 410'-1 is substantially similar to indicator 410-1, but larger; however, in other implementations, indicators 410-1, 410'-1 can be differentiated by changes in color, shading and the like. The change in indicator 410-1 to indicator 410'-1 generally indicates that finger 301 is presently touching an area associated with one or more of indicator 410-1 and notification messages 140. As described below, as finger 301 moves up touchscreen 125, each indicator 410 changes appearance to a new indicator to indicate when finger 301 is touching a given area 511.

In any event, in response to processor 120 detecting the sliding touch input, represented by arrows 305, 605, at touchscreen 125, processor 120 filters messages 140, 141, 142 according to first filtering condition 143 to filter messages 140, 141, 142 according to a type of messages (i.e. block 203 of method 200).

For example, in some implementations, processor 120 filters messages 140, 141, 142, according to the type, using first filtering condition 143 by: determining a length of the first portion represented by arrow 305; and, in response to determining the length of the first portion, filtering messages 140, 141, 142 according to the type on a basis of the length of the first portion, wherein a given length of the first portion is associated with one or more given types of messages 140, 141, 142. For example, in these implementations, a length of the first portion represented by arrow 305 can end at one of areas 511, which is in turn associated with a respective type of messages 140, 141, 142, and/or a respective indicator 410, which is also associated with the respective type. Hence, lengths of the first portion represented by arrow 305 that end in area 511-1 are associated with notification messages 140, lengths of the first portion represented by arrow 305 that end in area 511-2 are associated with email messages 141, and lengths of the first portion represented by arrow 305 that end in area 511-3 are associated with text messages 142. Hence, in these implementations, first filtering condition 143 includes conditions of selecting notification messages 140 when a length of the first portion represented by arrow 305 ends in area 511-1, selecting email messages 141 when a length of the first portion represented by arrow 305 ends in area 511-2, and selecting text messages 142 when a length of the first portion represented by arrow 305 ends in area 511-3.

Alternatively, processor 120 filters messages 140, 141, 142 according to the type using the first filtering condition 143 by: determining an area 511 of the change in direction at touchscreen 125; and, in response, filtering messages 140, 141, 142 according to the type on a basis of area 511, wherein a given area 511 of the touchscreen is associated with one or more given types of messages 140, 141, 142, as described above. Hence, in these implementations, first filtering condition 143 includes conditions of selecting notification messages 140 when the change in direction is located in area 511-1, selecting email messages 141 when the change in direction is located in area 511-2, and selecting text messages 142 when the change in direction is located in area 511-3.

In yet a further alternative, processor 120 is configured to filter messages 140, 141, 142 according to the type using first filtering condition 143 by: providing, at display 126, indicators 410 associated with types of unread messages; determining that an area 511 of the change in direction at touchscreen 125 includes a given indicator 410 associated with a given type of the unread messages; and, in response, filtering messages 140, 141, 142 according to the given type. For example, in these implementations, processor 120 can determine that the change in direction occurs in an area 511 that includes an indicator 410 associated with a given type, and filter messages 140, 141, 142 accordingly. Hence, in these implementations, first filtering condition 143 includes conditions of selecting notification messages 140 when the change in direction is located in an area 511 that includes indicator 410-1, selecting email messages 141 when the change in direction is located in an area 511 that includes indicator 410-2, and selecting text messages 142 when the change in direction is located in an area 511 that includes indicator 410-3.

In any event, it should be understood that a wide variety of configurations for first filtering condition 143 are contemplated, however each configuration comprises associating filtering and/or selecting a type of messages 140, 141, 142 on a basis of a location of a termination of first portion of the sliding touch input at touchscreen 125, and/or a location of the change in direction of the sliding touch input at touchscreen 125 (i.e. the change in direction includes an end of the first portion).

Figure 7:
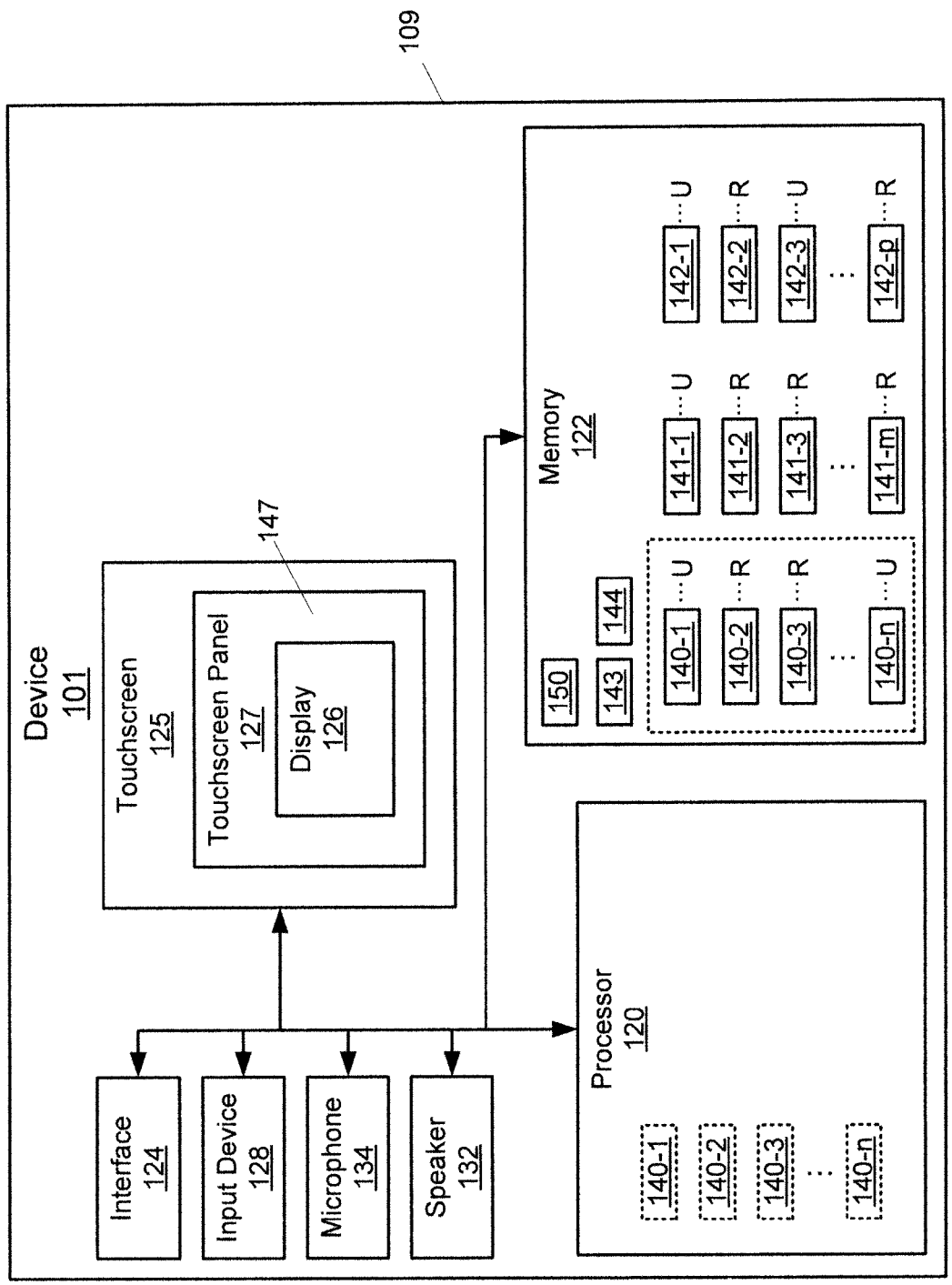
FIG. 7 depicts the device of FIG. 1, and a processor thereof, applying a first filtering condition, associated with the first portion of the sliding touch input, to messages stored therein, according to non-limiting implementations.

As described above, FIG. 6 shows that, in example implementations, first portion of the sliding touch input represented by arrows 305, 605 terminates in area 511-1 associated with notification messages 140 (and/or a change in direction of the sliding touch input occurs in area 511-1 and/or an area 511 that includes indicator 410-1). Hence, in response, as depicted in FIG. 7, processor 120 selects and/or filters notification messages 140, for example by retrieving at least a portion of messages 140 from memory 122; further processor 120 need not retrieve an entirety of a given message 140; for example, only metadata associated with a given message can be retrieved.

Figure 8:
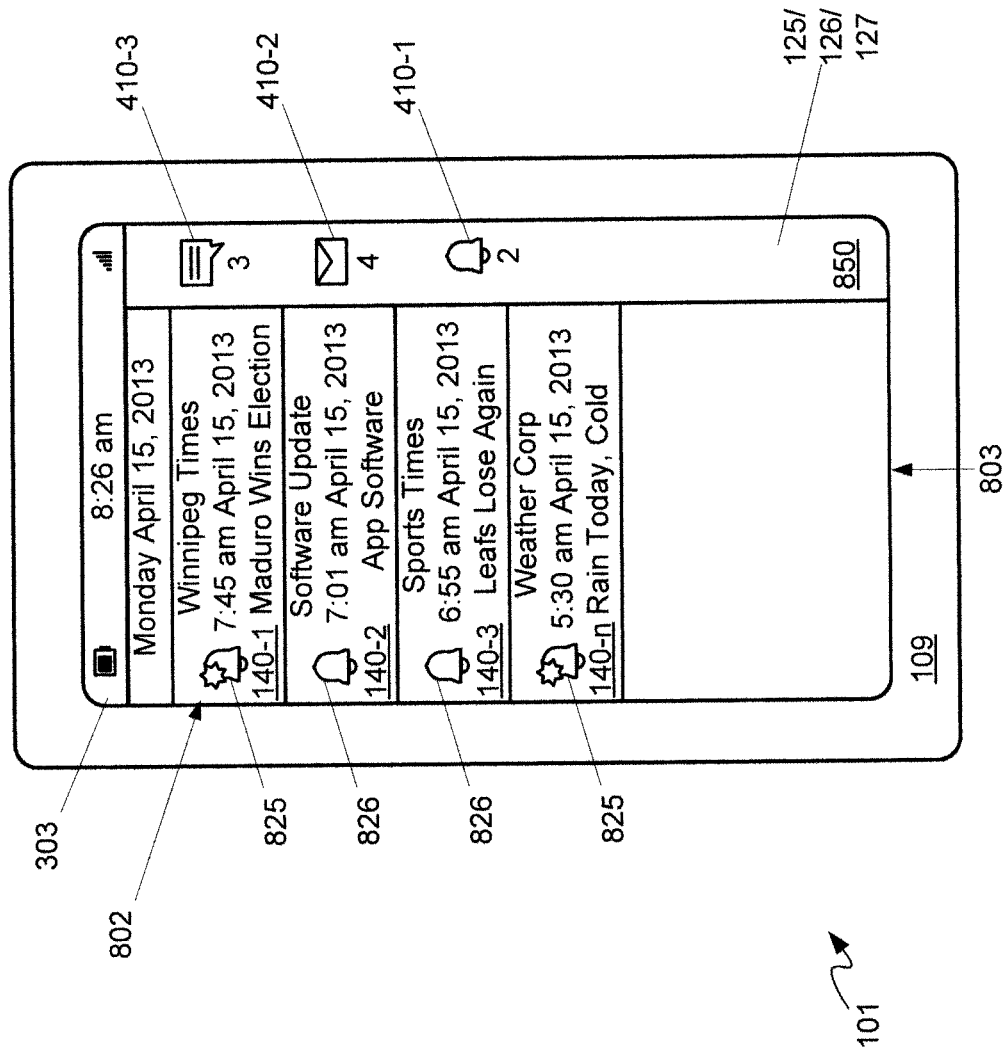
FIG. 8 depicts a perspective view of the device of FIG. 1, showing a resulting GUI of a list of selected messages after the first filtering condition of FIG. 7 is applied, according to non-limiting implementations.

Further, as processor 120 filters messages 140, 141, 142 according to first filtering condition 143, and as first portion of the sliding touch input represented by arrows 305, 605 terminates in an area 511 associated with notification messages 140, in response to detecting second portion of the sliding touch input represented by arrows 305, 605, as depicted in FIG. 8, processor 120 optionally changes GUI 402 to GUI 802, for example using animation. In GUI 802, processor 120 provides a list 803 of notification messages 140 at display 126, but not other types of messages 141, 142. Finger 301 is no longer depicted, as finger 301 no longer touches touchscreen 125 after the sliding touch input is received.

It is appreciated that each notification message 140 in list 803 is provided in a respective row and/or rows (as depicted, three rows for each notification message 140, however a number of rows dedicated to each notification message 140 can be adjustable, for example based on font size of text in each row and/or configurable, for example using a pulldown menu and the like).

Further, each notification message 140 is represented in list 803 by one or more of respective metadata associated with each notification message 140, and a subject of each notification message 140. For example, each row of list 803 comprises metadata of a respective notification message 140 including, but not limited to, a time and/or date that a respective notification message 140 was received, a subject of a respective notification message 140, and identifier of a sender of a respective notification message 140, a given subtype of a given notification message 140 (e.g. "Software Update") and the like. Further the type of data displayed in each row for each notification message 140 can be one or more of configurable and respective to a given subtype of a respective notification message 140.

Data provided for a respective notification message 140 in list 803 can also comprise a respective icon 825, 826 indicative, respectfully, of an unread notification message 140, and a read notification message 140. Each icon 825 is similar to a respective icon 826, however with a graphical change thereto; while the changes between icons 825, 826 are depicted as differences in shape, in other implementations, icons 825, 826 can be differentiated by changes in color, shading and the like.

Not all notification messages 140 need be provided at display 126 in list 803; rather, list 803 can be "slidable" so that a user can select list 803 using finger 301 and "slide" list 803 "up" or "down" to reveal further notification messages 140 not initially displayed at display 126.

In depicted implementations, indicators 410 continue to be provided at display 126, however, they are moved to an opposite side of touchscreen 125 than in GUI 402, in a direction of arrow 605. Specifically, indicators 410 are provided in a bar 850 located at an edge of display 126 located in a direction of arrow 605 so that, to a user, it appears that list 803, and indicators 410, are being pulled by finger 301 from a first edge of display 126, as in FIG. 4, to an opposite edge of display 126 (e.g. from left to right). Further, indicator 410-1 has been provided rather than indicator 410'-1.

Hence, by the use of a continuous sliding gesture that can be implemented with one hand, first filtering condition 143 can be applied to messages 140, 141, 142. Further, different types of messages 140, 141, 142 can be selected depending on one or more of a length of the sliding touch input represented by arrow 305, a location of the change in direction of the sliding touch input.

Figure 9:
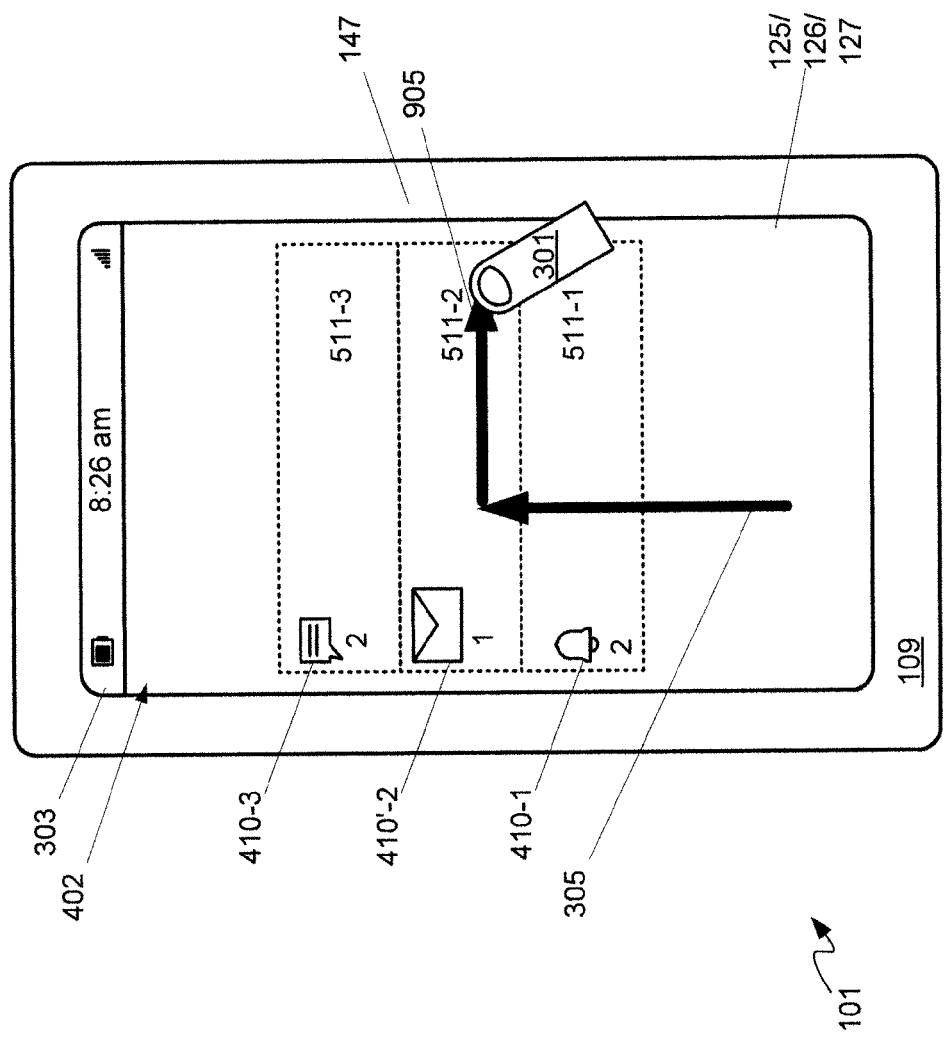
FIG. 9 depicts a perspective view of the device of FIG. 1, showing the simplified GUI of FIG. 5, however with a first portion of the sliding touch input longer than the first portion of FIG. 6, and a second portion of sliding touch input being received at the device, according to non-limiting implementations.
Figure 10:
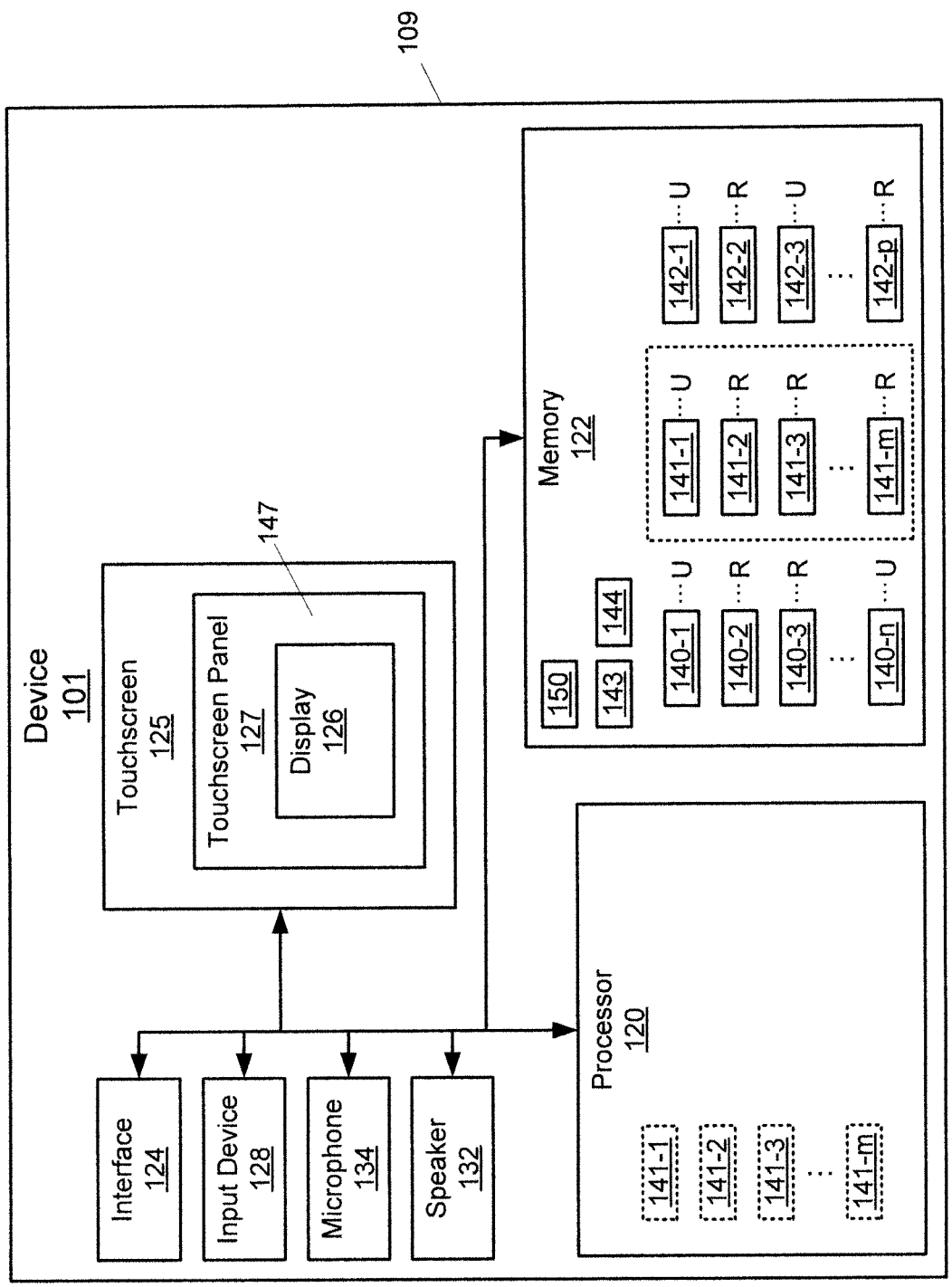
FIG. 10 depicts the device of FIG. 1, and a processor thereof, applying a first filtering condition, associated with the first portion of the sliding touch input, to messages stored therein, in response to receiving the first portion of FIG. 9, according to non-limiting implementations.

For example, attention is next directed to FIG. 9, which is similar to FIG. 6, however, in FIG. 9, the first portion of the sliding touch input represented by arrow 305 ends in area 511-2, and a second portion is represented by arrow 905, which is similar to arrow 605, but higher on touchscreen 125, in area 511-2. Hence, a first portion of the sliding touch input represented by arrows 305, 905 terminates in area 511-2 associated with email messages 141 (and/or a change in direction of the sliding touch input occurs in area 511-2 and/or an area 511 that includes indicator 410-2). Hence, in response, as depicted in FIG. 10, processor 120 selects and/or filters email messages 141, for example by retrieving at least a portion of messages 141 from memory 122, similar to processor 120 retrieving at least a portion of messages 140 from memory 122 described above with respect to FIG. 7.

Figure 11:
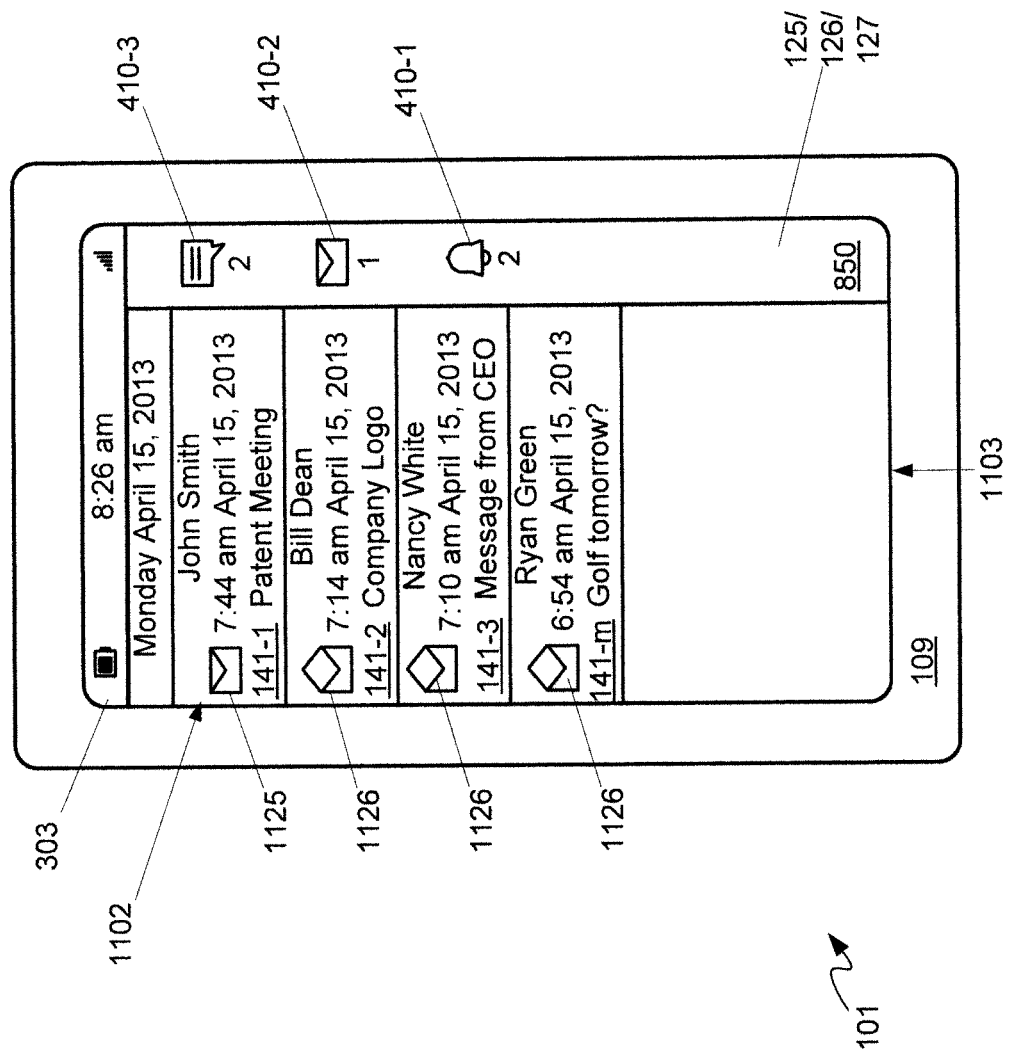
FIG. 11 depicts a perspective view of the device of FIG. 1 showing a resulting GUI of a list of selected messages after the first filtering condition of FIG. 10 is applied, according to non-limiting implementations.

Further, as processor 120 filters messages 140, 141, 142 according to first filtering condition 143, and as first portion of the sliding touch input represented by arrows 305, 905 terminates in area 511-2 associated with email messages 141, in response to detecting second portion of the sliding touch input represented by arrows 305, 905, as depicted in FIG. 11, processor 120 optionally changes GUI 402 to GUI 1102, for example using animation. GUI 1102 is substantially similar to GUI 802, however in GUI 1102, processor 120 provides a list 1103 of email messages 141 at display 126, but not other types of messages 140, 142. List 1103 is otherwise substantially similar to list 803.

Data provided for a respective email message 141 in list 1103 can also comprise a respective icon 1125, 1126 indicative, respectfully, of an unread email message 141, and a read email message 141. Each icon 1125 is similar to a respective icon 1126, however with a graphical change thereto; while the changes between icons 1125, 1126 are depicted as differences in shape, in other implementations, icons 1125, 1126 can be differentiated by changes in color, shading and the like.

Figure 12:
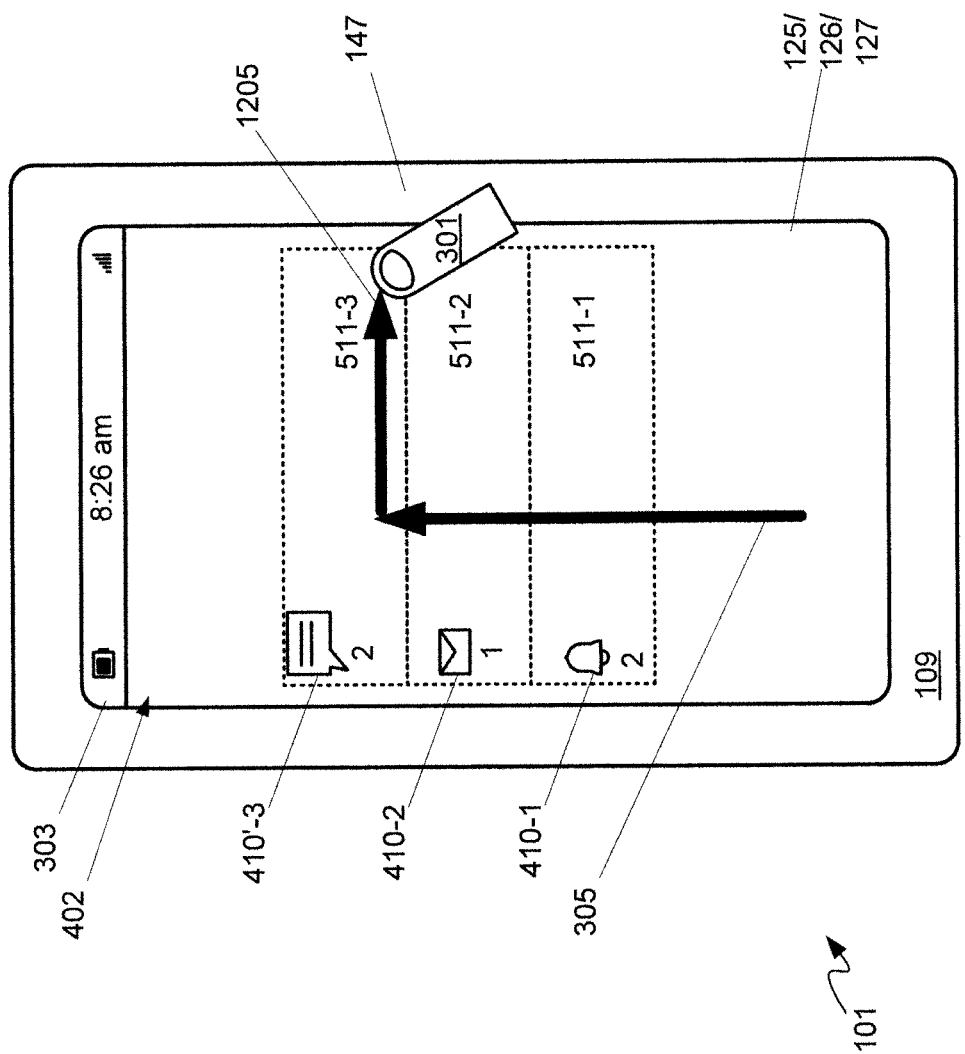
FIG. 12 depicts a perspective view of the device of FIG. 1, showing the simplified GUI of FIG. 5, however with a first portion of the sliding touch input longer than the first portion of FIG. 9, and a second portion of sliding touch input being received at the device, according to non-limiting implementations.
Figure 13:
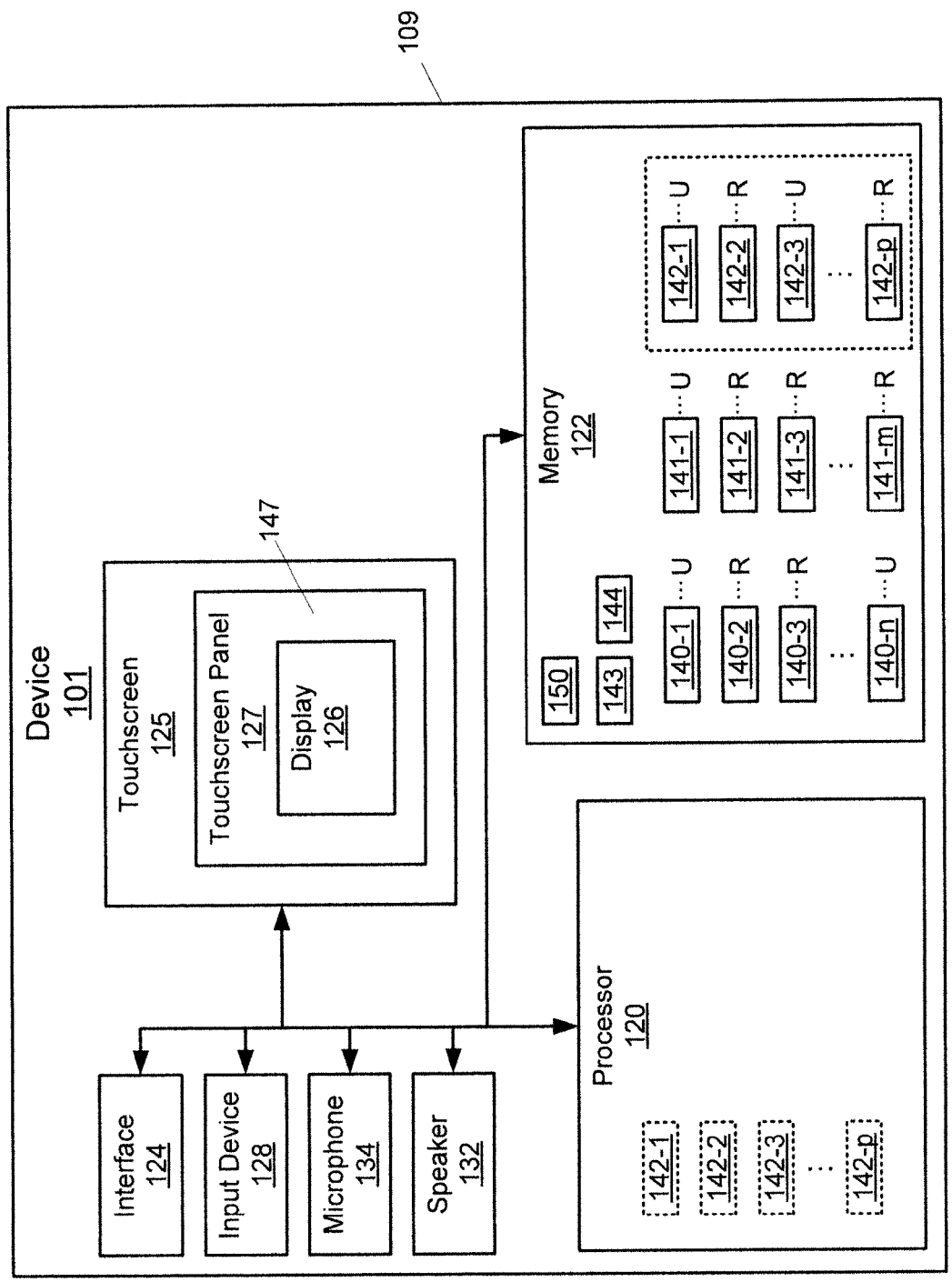
FIG. 13 depicts the device of FIG. 1, and a processor thereof, applying a first filtering condition, associated with the first portion of the sliding touch input, to messages stored therein, in response to receiving the first portion of FIG. 12, according to non-limiting implementations.

Attention is next directed to FIG. 12, which is similar to FIG. 6, however, in FIG. 12, the first portion of the sliding touch input represented by arrow 305 ends in area 511-3, and a second portion is represented by arrow 1205, which is similar to arrow 605, but higher on touchscreen 125, in area 511-3. Hence, a first portion of the sliding touch input represented by arrows 305, 1205 terminates in area 511-3 associated with text messages 142 (and/or a change in direction of the sliding touch input occurs in area 511-3 and/or an area 511 that includes indicator 410-3). Hence, in response, as depicted in FIG. 13, processor 120 selects and/or filters text messages 142, for example by retrieving at least a portion of messages 142 from memory 122, similar to processor 120 retrieving at least a portion of messages 140 from memory 122 described above with respect to FIG. 7.

Figure 14:
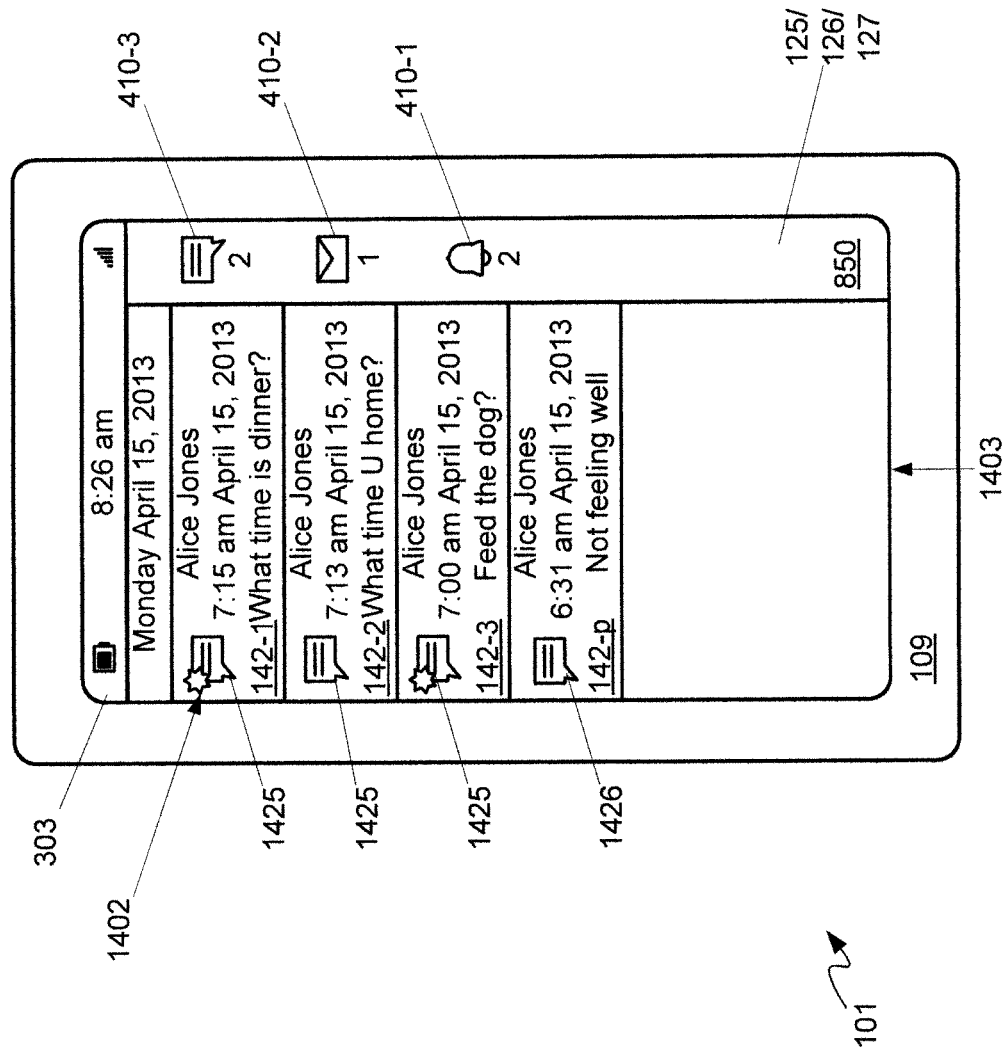
FIG. 14 depicts a perspective view of the device of FIG. 1 showing a resulting GUI of a list of selected messages after the first filtering condition of FIG. 13 is applied, according to non-limiting implementations.

Further, as processor 120 filters messages 140, 141, 142 according to first filtering condition 143, and as first portion of the sliding touch input represented by arrows 305, 1205 terminates in area 511-3 associated with text messages 142, in response to detecting second portion of the sliding touch input represented by arrows 305, 1205, as depicted in FIG. 14, processor 120 optionally changes GUI 402 to GUI 1402, for example using animation. GUI 1402 is substantially similar to GUI 802, however in GUI 1402, processor 120 provides a list 1403 of text messages 142 at display 126, but not other types of messages 140, 141. Further, data provided on respective rows of list 1403 can include a portion of a body of a respective text message 142 that can fit on a line of list 1403. List 1403 is otherwise substantially similar to list 803.

Data provided for a respective text message 142 in list 1403 can also comprise a respective icon 1425, 1426 indicative, respectfully, of an unread text message 142, and a read text message 142. Each icon 1425 is similar to a respective icon 1426, however with a graphical change thereto; while the changes between icons 1425, 1426 are depicted as differences in shape, in other implementations, icons 1425, 1426 can be differentiated by changes in color, shading and the like.

Figure 15:
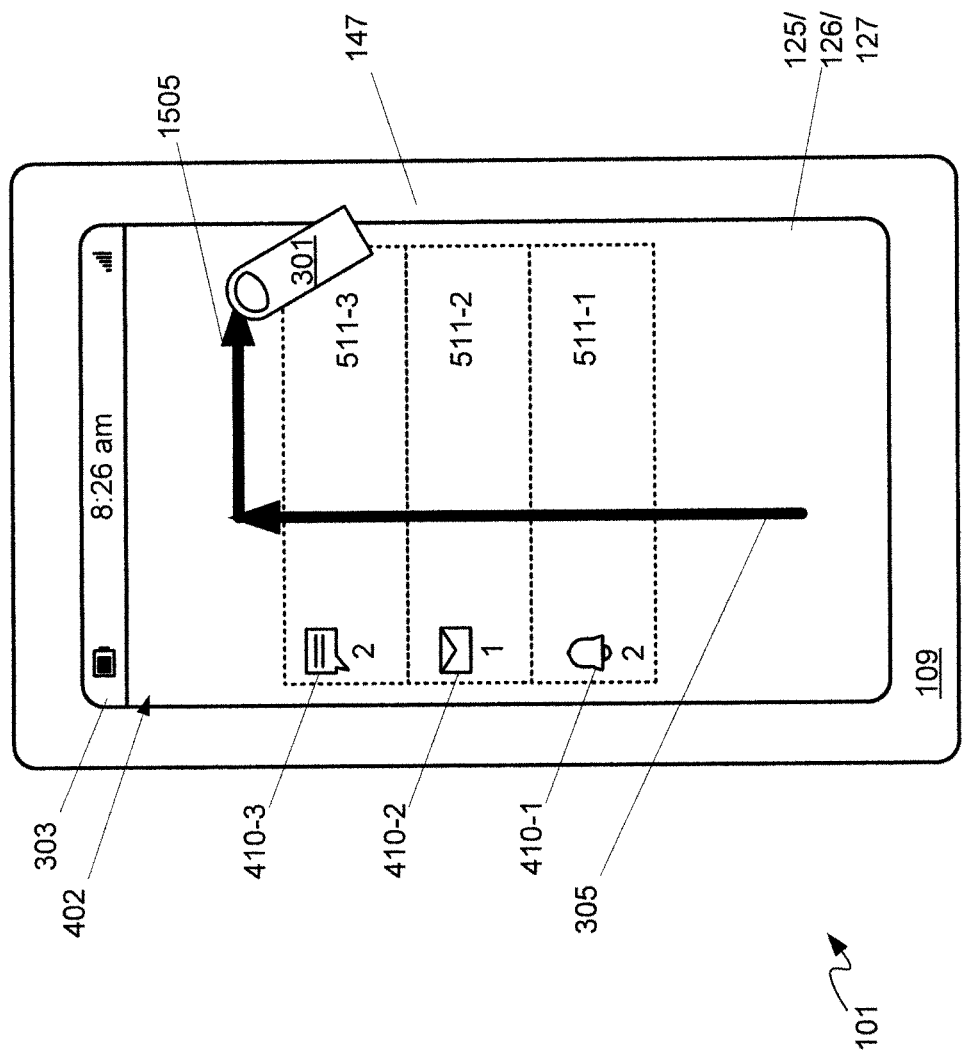
FIG. 15 depicts a perspective view of the device of FIG. 1, showing the simplified GUI of FIG. 5, however with a first portion of the sliding touch input longer than the first portion of FIG. 12, and a second portion of sliding touch input being received at the device, according to non-limiting implementations.

Attention is next directed to FIG. 15, which is similar to FIG. 6, however, in FIG. 15, the first portion of the sliding touch input represented by arrow 305 does not end in any of areas 511, and a second portion of the sliding touch input, represented by arrow 1505, which is similar to arrow 605, is also not in any of areas 511. Rather, the first portion of the sliding touch input ends above areas 511, and the second portion is also above area 511-3; alternatively, in these implementations, the first portion could end below areas 511 and the second portion could be located below areas 511.

In any event, in these implementations, processor 120 can determine one or more of: a length of the first portion does not terminate in any of areas 511 of touchscreen 125 associated with any of the types of messages 140, 141, 142; the change in direction at touchscreen 125 does not occur in any of areas 511; and an area of the change in direction does not include a given indicator 410 associated with any of the types of messages 140, 141, 142. In these implementations, first filtering condition 143 includes a condition of, when any of these events occur and/or are detected by processor 120, then one or more of the following occurs: filtering messages 140, 141, 142 to include all the types of messages 140, 141, 142; and filtering messages 140, 141, 142 according to a given previous filtering condition. The specific action to be taken can be configured at device 101, for example via a pulldown menu and the like, and stored at application 150.

Figure 16:
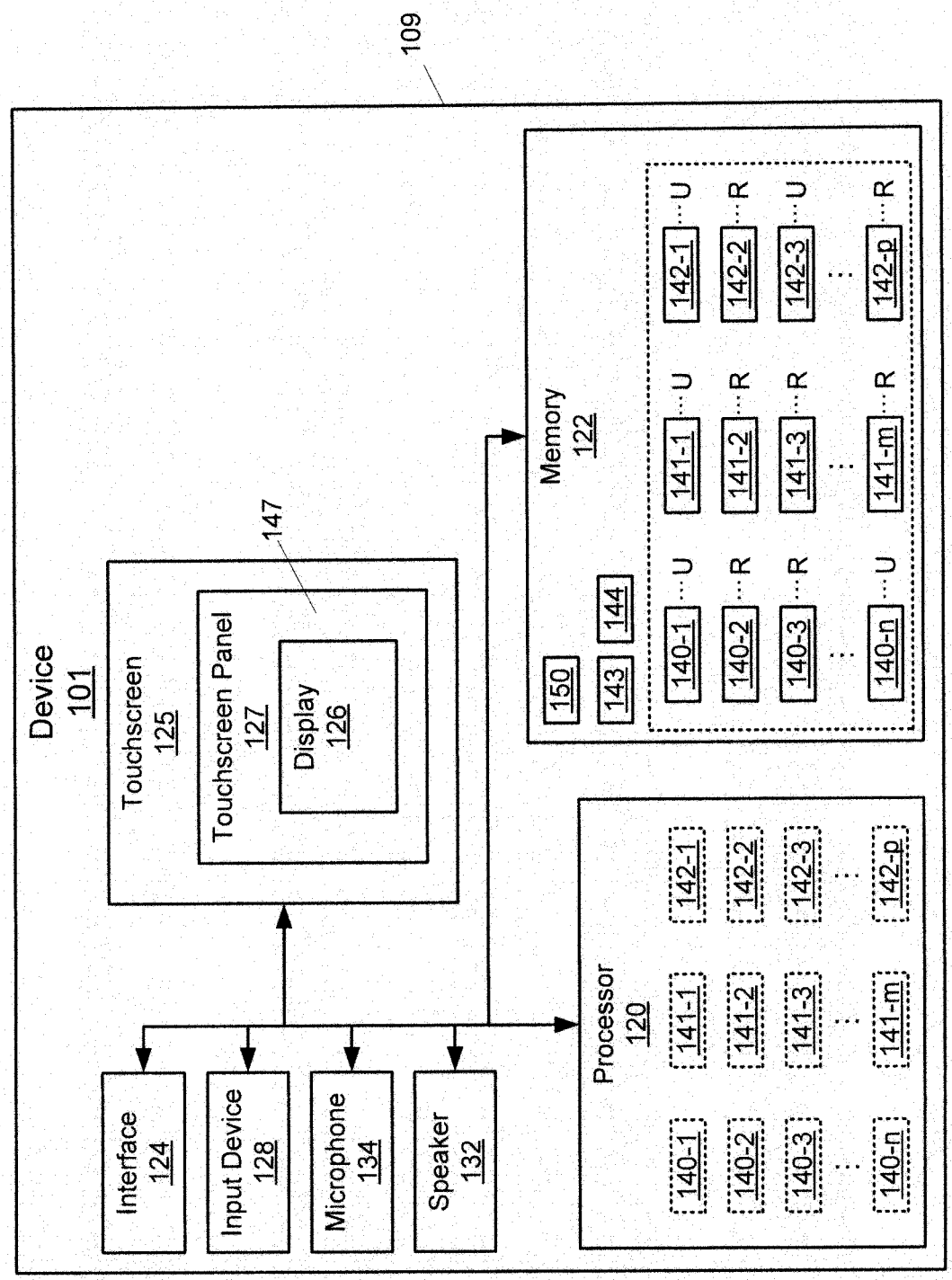
FIG. 16 depicts the device of FIG. 1, and a processor thereof, applying a first filtering condition, associated with the first portion of the sliding touch input, to messages stored therein, in response to receiving the first portion of FIG. 15, according to non-limiting implementations.

For example, when first filtering condition 143 comprises filtering messages 140, 141, 142 to include all the types of messages 140, 141, 142, as depicted in FIG. 16, processor 120 selects and/or filters all messages 140, 141, 142, for example by retrieving at least a portion of messages 140, 141, 142 from memory 122, similar to processor 120 retrieving at least a portion of messages 140 from memory 122 described above with respect to FIG. 7.

Figure 17:
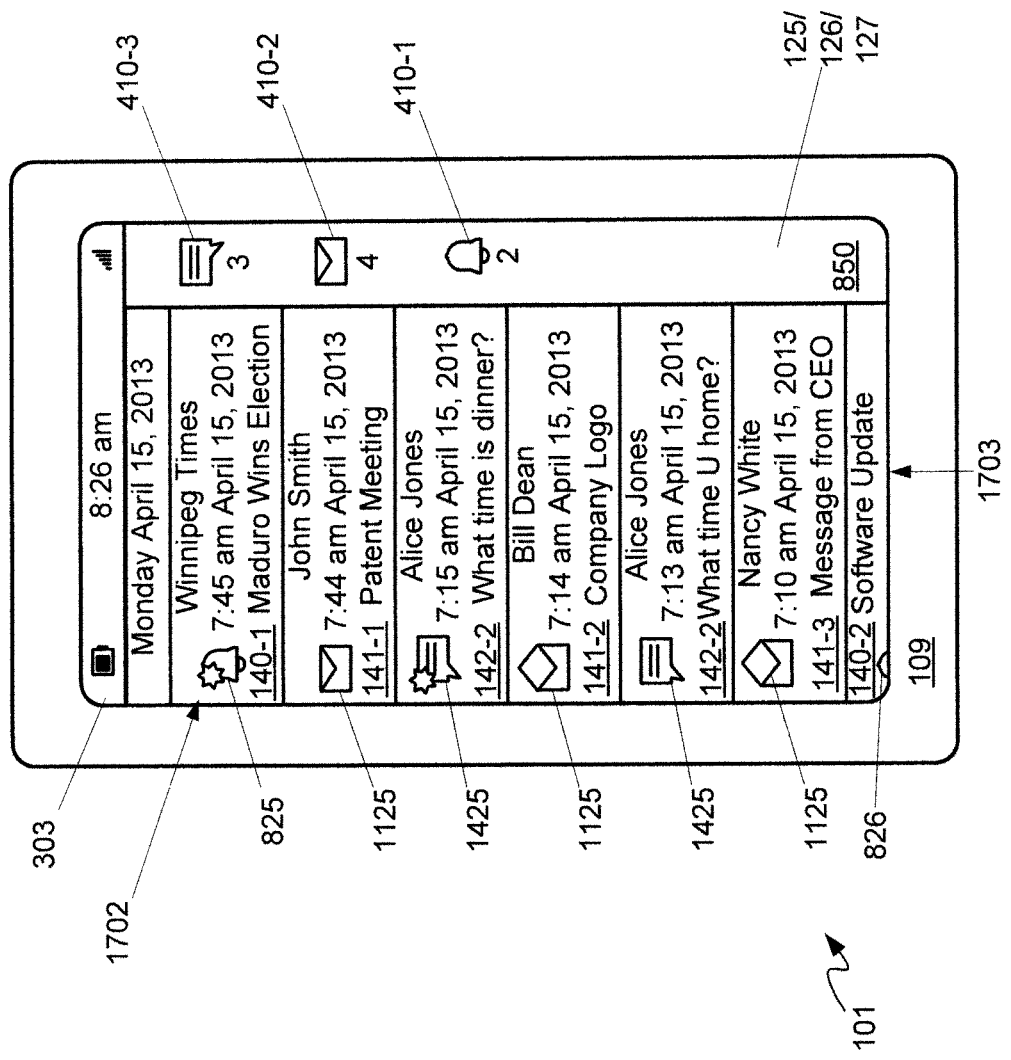
FIG. 17 depicts a perspective view of the device of FIG. 1 showing a resulting GUI of a list selected messages after the first filtering condition of FIG. 16 is applied, according to non-limiting implementations.

Further, as processor 120 filters messages 140, 141, 142 according to first filtering condition 143, and as first portion of the sliding touch input represented by arrows 305, 1505 does not terminate in any of areas 511, in response to detecting second portion of the sliding touch input represented by arrows 305, 1505, as depicted in FIG. 17, processor 120 optionally changes GUI 402 to GUI 1702, for example using animation. GUI 1702 is substantially similar to GUI 802, however in GUI 1702, processor 120 provides a list 1703 of all messages 140, 141, 142 at display 126. List 1703 is otherwise substantially similar to list 803.

Alternatively, when a given previous filtering condition was applied to messages 140, 141, 142, for example a filtering condition applied to messages 140, 141, 142 when a list of messages 140, 141, 142 was provided at display 126, list 1703 can include all messages 140, 141, 142 which were included on the previous list. For example, a list of messages 140, 141, 142 may have been provided at display 126 in a messaging application, and filtering conditions manually applied and/or selected; hence, the same previous filtering conditions can be applied when providing list 1703 instead of providing all messages 140, 141, 142 in list 1703. Last previous filtering conditions can be stored at one or more of application 150 and memory 122.

Attention is next directed to FIG. 18, which is similar to FIG. 6, in that the first portion of the sliding touch input represented by arrow 305 ends in area 511-1, and a second portion of the sliding touch input, represented by arrow 1805, which is similar to arrow 605, is also in area 511-1. However, in these implementations, and in contrast to FIG. 6, the second portion of the sliding touch input represented by arrow 1805 is received within a threshold time period (and can also be at least a given length: in other words, the second portion is above a threshold speed and/or finger 301 is moving above a threshold speed), as denoted by arrow 1805 being of greater width than arrow 605. The threshold time period (and/or threshold speed) can be determined by one or more of experimentally, heuristically, trial and error, using user interface design software and the like, and stored at one or more of application 150 and memory 122.

Hence, a first portion of the sliding touch input represented by arrows 305, 1805 terminates in area 511-1 associated with notification messages 140 (and/or a change in direction of the sliding touch input occurs in area 511-1 and/or an area 511 that includes indicator 410-1), which results in first filtering condition 143 being applied to messages 140, 141, 142 so that notification messages 140 are selected, as described above.

However, in these implementations, second filtering condition 144 can comprise determining that the second portion is received within the threshold time period; and, in response, filtering messages 140, 141, 142 according to the read status so that only one or more of unread messages 140, 141, 142 remain. In other words, processor 120 selects only unread messages 140, 141, 142 when one or more the second portion of the sliding touch input is received within a threshold time period and/or is above a threshold speed.

In this instance, as both first filtering condition 143 and second filtering condition 144 are applied, a list similar to list 803 can be provided, but with only unread notification messages 140 provided, for example see FIG. 21 described below.

Alternatively, second filtering condition 144 can comprise determining that the second portion includes touch input at bezel portion 147 of touchscreen 125; and, in response, filtering messages 140, 141, 142 according to the read status so that only one or more of the unread messages 140, 141, 142 remain.

For example attention is next directed to FIG. 19, which is similar to FIG. 6, in that the first portion of the sliding touch input represented by arrow 305 ends in area 511-1, and a second portion of the sliding touch input is represented by arrow 1905, which is similar to arrow 605, is also in area 511-1, but terminates at bezel portion 147. Hence, second filtering condition 144 can be applied to messages 140, 141, 142 as the second portion of the sliding touch input includes touch input from bezel portion 147.

In response to one or more of the second portion of a sliding touch input being received within a threshold time period and/or includes touch input from bezel portion 147, as depicted in FIG. 20, processor 120 selects and/or filters unread notification messages 140, for example by retrieving at least a portion of messages 140 designated as unread, and/or having a read status of unread, from memory 122, similar to processor 120 retrieving at least a portion of messages 140 from memory 122 described above with respect to FIG. 7. Messages 140 designated as read, and/or having a read status of read, are not retrieved from memory 122.

Further, as processor 120 filters messages 140, 141, 142 according to first filtering condition 143 and second filtering condition 144, and as first portion of the sliding touch input represented by arrows 305, 1805 and/or arrows 305, 1905, terminates in area 511-1 associated with notification messages 140, in response to detecting second portion of the sliding touch input represented by arrows 305, 1805 and/or arrows 305, 1905, as depicted in FIG. 21, processor 120 optionally changes GUI 402 to GUI 2102, for example using animation. GUI 2102 is substantially similar to GUI 802, however in GUI 2102, processor 120 provides a list 2103 of unread notification messages 140 at display 126, but not other types of messages 141, 142 and not read messages 140. List 2103 is otherwise substantially similar to list 803.

It is further appreciated that second filtering condition 144 can be applied in combination with any of the previously described conditions of first filtering condition 143. Hence, when first portion of sliding touch input represented by arrow 305 results in email messages 141 being selected, further applying second filtering condition 144 can further result in only unread email messages 141 being selected and/or provided in a list similar to list 1103. Similarly, when first portion of sliding touch input represented by arrow 305 results in text messages 142 being selected, further applying second filtering condition 144 can further result in only unread text messages 142 being selected and/or provided in a list similar to list 1403.

However, in other implementations, second filtering condition 144 can be applied without applying first filtering condition 143. For example, attention is next directed to FIG. 22, which is similar to FIG. 6, but a GUI 2202 is provided that is substantially similar to GUI 402, but none of indicators 410 are changed, and there are no areas 511. Hence, FIG. 22 further depicts: a first portion of sliding touch input, represented by arrow 2204, that results in when finger 301 slides up touchscreen 125, arrow 2204 similar to arrow 305; and a second portion of the sliding touch input represented by arrow 2205, which is similar to arrow 1805.

However, in these implementations, first filtering condition 143 is not applied when first portion of the sliding touch input is detected. However, as the second portion of the sliding touch input represented by arrow 2205 is received within a threshold time period, similar to the second portion of the sliding touch input represented by arrow 1805, processor 120 applies second filtering condition 144 to all messages 140, 141, 142, for example to provide a list of all unread messages 140, 141, 142, for example see FIG. 25 described below.

Alternatively, as described above, second filtering condition 144 can comprise determining that the second portion includes touch input at bezel portion 147 of touchscreen 125; and, in response, filtering messages 140, 141, 142 according to the read status so that that only one or more of the unread messages 140, 141, 142 remain. Hence, attention is next directed to FIG. 23, which is similar to FIG. 6, but a GUI 2302 is provided that is substantially similar to GUI 402, but none of indicators 410 are changed, and there are no areas 511. Hence, FIG. 23 further depicts: a first portion of sliding touch input, represented by arrow 2304, that results in when finger 301 slides up touchscreen 125, arrow 2304 similar to arrow 305; and a second portion of the sliding touch input represented by arrow 2305, which is similar to arrow 1905, and terminates at bezel portion 147. Hence, second filtering condition 144 can be applied to messages 140, 141, 142 as the second portion of the sliding touch input includes touch input from bezel portion 147.

Alternatively, rather than the second portion of sliding touch input terminating at bezel portion 147, the second portion can include a static touch input proximal an edge of touchscreen 125. In other words, the second portion can end with finger 301 maintaining a position at touchscreen 125 greater than or equal to a given time period, for example about 1 second and the like (the given time period configurable at device 101).

In response to one or more of the second portion of a sliding touch input being received within a threshold time period and/or includes touch input from bezel portion 147 and/or including static touch input greater than or equal to a given time period, as depicted in FIG. 24, processor 120 selects and/or filters messages 140, 141, 142 designated as unread, for example by retrieving at least a portion of messages 140, 141, 142 designated as unread, and/or having a read status of unread, from memory 122, similar to processor 120 retrieving at least a portion of messages 140 from memory 122 described above with respect to FIG. 7. Messages 140, 141, 142 designated as read, and/or having a read status of read are not retrieved from memory 122.

Further, as processor 120 filters messages 140, 141, 142 according to second filtering condition 144, and not first filtering condition 143, in response to detecting second portion of the sliding touch input represented by arrows 2204, 2205 and/or arrows 2304, 2305, as depicted in FIG. 25, processor 120 optionally changes GUI 2202 and/or GUI 2302 to GUI 2502, for example using animation. GUI 2502 is substantially similar to GUI 1702, however in GUI 2502, processor 120 provides a list 2503 of unread messages 140, 141, 142 at display 126, but not messages 140, 141, 142 designated as read. List 2503 is otherwise substantially similar to list 1703. In other words, when a second portion of the sliding touch input is received within a threshold time period and/or includes touch input from bezel portion 147 and/or includes static touch input greater than or equal to a given time period, a list of unread messages 140, 141, 142 can be provided, as in GUI 2502.

Alternatively, processor 120 can be further configured to filter messages 140, 141, 142 according to the read status using second filtering condition 144 by selecting only a most recent unread message when filtering messages 140, 141, 142 according to the read status. Hence, for example, when notification message 140-1 comprises a most recently received one of messages 140, 141, 142 that is also designated as unread, notification message 140-1 can be selected. Continuing with this example, as processor 120 filters messages 140, 141, 142 according to second filtering condition 144, and not first filtering condition 143, in response to detecting second portion of the sliding touch input represented by arrows 2204, 2205 and/or arrows 2304, 2305, as depicted in FIG. 26, processor 120 optionally changes GUI 2202 and/or GUI 2302 to GUI 2602, for example using animation. GUI 2602 is substantially similar to GUI 1702, however in GUI 2602, processor 120 provides only a most recent unread message 140-1 in a list 2603 of unread messages 140, 141, 142 at display 126, but not other messages 140, 141, 142. In other words, when a second portion of the sliding touch input is received within a threshold time period and/or includes touch input from bezel portion 147 and/or includes static touch input greater than or equal to a given time period, only a most recent unread message 140-1 can be provided, as in GUI 2602.

Optionally, as depicted, a preview of the most recent unread message 140-1 is provided, that can include at least a portion of a body of the most recent unread message 140-1 and, in some instances, all of the body of the most recent unread message 140-1.

In yet further implementations, when GUI 2602 is provided, further input can be received at touchscreen 125 (and/or at least one input device 128) to sequentially provide unread messages 140, 141, 142, for example in sequence starting with a most recent unread message 140, 141, 142 and then next unread messages 140, 141, 142. Further, unread messages 140, 141, 142 can optionally be designated as read and/or deleted upon receipt of yet further input at touchscreen 125 (and/or at least one input device 128).

In yet further implementations, processor 120 can be further configured to filter messages 140, 141, 142 according to the read status using second filtering condition 144, as described above, by selecting only a most recent unread message of a given type, when filtering messages 140, 141, 142 according to the read status, the given type selected based on one or more of: a length of a first portion of a sliding touch input that includes a change in direction, an area of the change in direction at touchscreen 125, and determining that the area of the change in direction at touchscreen 125 includes a given indicator 410 associated with the given type.

In other words, the concepts described with respect to FIGS. 4 to 14 can be combined with the concepts described with respect to FIGS. 22, 23 and 26. Hence, processor 120 can select a most recent unread message 140, 141, 142 of a given type based on both: a first portion of a sliding touch input (e.g. a first portion corresponding to one or more of arrows 2204, 2304) being of a given length associated with a given type of message 140, 141, 142, similar to a first portion corresponding to arrow 305; and a second portion of the sliding touch input being received within a threshold time period and/or including touch input from bezel portion 147 and/or including static touch input greater than or equal to a given time period.

Alternatively, processor 120 can select a most recent unread message 140, 141, 142 of a given type based on both: an area of the change in direction of the sliding touch input is associated with the given type; and a second portion of the sliding touch input being received within a threshold time period and/or including touch input from bezel portion 147 and/or including static touch input greater than or equal to a given time period.

Alternatively, processor 120 can select a most recent unread message 140, 141, 142 of a given type based on both: determining that the area of the change in direction at touchscreen 125 includes a given indicator 410 associated with the given type; and a second portion of the sliding touch input being received within a threshold time period and/or including touch input from bezel portion 147 and/or including static touch input greater than or equal to a given time period.

Provided herein is a device configured to filter messages when a series of touch gestures are detected at the device as sliding touch input received at the device. The sliding touch input includes a first portion, a second portion, and change in direction; a first filtering condition is associated with the first portion and/or a second filtering condition is associated with the second portion. The first filtering condition and the second filtering condition can be applied to the messages stored at the device. A first filtering condition associated with the first portion, when applied to the messages, can cause a subset of the messages of a given type to be selected. A second filtering condition associated with the second portion, when applied to the messages, can cause unread messages to be selected. Such a device can be particularly useful when the device is a mobile electronic device and/or mobile communications device that can be held and operated with one hand. For example, the thumb of the hand can be used to provide the touch input. The series of touch gestures has also been found to be more ergonomic for one-handed operation than using menus and/or search options for accessing unread messages.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
  a processor; a memory storing messages of different types, at least a subset of the messages designated as unread messages; and a touchscreen including a display; the processor configured to:
    provide message-type indicators in different areas of the touchscreen;
    detect a sliding touch input at the touchscreen, the sliding touch input comprising a first portion in a first direction and a second portion in a second direction such that the sliding touch input includes a change in direction, the second direction perpendicular to the first direction, and the different areas along the first portion;
    determine that an end of the first portion is in an area that includes a given message-type indicator to identify an associated message-type filter condition associated with the first portion, the change in direction also in the area; and, in response,
    filter the messages according to the message-type filtering condition associated with the first portion and a second filtering condition associated with the second portion,
    the processor further configured to filter the messages according to the associated message-type filter condition by: determining one or more of: a length of the first portion does not terminate in any of areas of the touchscreen associated with any of the types of the messages; the change in direction at the touchscreen does not occur in any of the areas; and a respective area of the change in direction does not include a given indicator associated with any of the types of the messages, including the message-type indicator; and, in response, one or more of: filtering the messages to include all the types of the messages; and, filtering the messages according to a given previous filtering condition.

2. The device of claim 1, wherein the first portion comprises a length, and the processor is further configured to filter the messages according to the associated message-type filter condition by:
  determining the length of the first portion; and, in response to determining the length of the first portion,
  filtering the messages according to the type on a basis of the length of the first portion, wherein a given length of the first portion is associated with one or more given types of the messages, as indicated by the message-type indicator.

3. The device of claim 1, wherein the area of the message-type indicator includes a location of the change in direction, and the processor is further configured to filter the messages according to the associated message-type filter condition by:
  determining that the area of the message-type indicator includes the location of the change in direction at the touchscreen; and, in response,
  filtering the messages according to the type on a basis of the area, wherein a given area of the touchscreen is associated with one or more given types of the messages, as indicated by the message-type indicator.

4. The device of claim 1, wherein the processor is further configured to filter the messages according to the associated message-type filter condition by:
  providing, at the display, indicators associated with types of the messages, including the message-type indicator;
  determining that the area includes the change in direction and the message-type indicator associated with a given type of the messages; and, in response,
  filtering the messages according to the given type.

5. The device of claim 4, wherein the processor is further configured to change the message-type indicator, at the display, when a current touch input of the first portion is in the area including the given indicator.

6. The device of claim 1, wherein the processor is further configured to filter the messages according to the read status using the second filtering condition by:
  determining that the second portion is received within a threshold time period; and, in response,
  filtering the messages according to the read status so that only one or more of the unread messages remain.

7. The device of claim 1, wherein the processor is further configured to filter the messages according to the read status using the second filtering condition by:
  determining that the second portion includes one or more of: touch input at a bezel portion of the touchscreen, and static touch input greater than or equal to a given time period; and, in response,
  filtering the messages according to the read status so that only one or more of the unread messages remain.

8. The device of claim 1, wherein the processor is further configured to filter the messages according to the read status using the second filtering condition by selecting only a most recent unread message.

9. The device of claim 1, wherein the processor is further configured to filter the messages according to the read status using the second filtering condition by selecting only a most recent unread message of a given type, the given type selected based on one or more of: a length of the first portion, an area of the change in direction at the touchscreen, and determining that the area of the change in direction at the touchscreen includes a given indicator associated with the given type.

10. A method comprising:
  at a device comprising: a processor; a memory storing messages of different types, at least a subset of the messages designated as unread messages; and a touchscreen including a display, providing message-type indicators in different areas of the touchscreen;
  detecting, using the processor, a sliding touch input at the touchscreen, the sliding touch input comprising a first portion in a first direction and a second portion in a second direction such that the sliding touch input includes a change in direction, the second direction perpendicular to the first direction, and the different areas along the first portion;
  determining that an end of the first portion is in an area that includes a given message-type indicator to identify an associated message-type filter condition associated with the first portion, the change in direction also in the area; and, in response, filtering the messages at the processor according to the message-type filtering condition associated with the first portion and a second filtering condition associated with the second portion, the filtering the messages according to the associated message-type filter condition further comprising: determining one or more of: a length of the first portion does not terminate in any of areas of the touchscreen associated with any of the types of the messages; the change in direction at the touchscreen does not occur in any of the areas; and a respective area of the change in direction does not include a given indicator associated with any of the types of the messages, including the message-type indicator; and, in response, one or more of: filtering the messages to include all the types of the messages; and, filtering the messages according to a given previous filtering condition.

11. The method of claim 10, wherein the first portion comprises a length of the first portion, and the filtering the messages according to the associated message-type filter condition further comprises:

determining the length of the first portion; and, in response to determining the length of the first portion, filtering the messages according to the type on a basis of the length of the first portion, wherein a given length of the first portion is associated with one or more given types of the messages, as indicated by the message-type indicator.

12. The method of claim 10, wherein the area of the message-type indicator includes a location of the change in direction, and the filtering the messages according to the associated message-type filter condition further comprises:

determining that the area of the message-type indicator includes the location of the change in direction at the touchscreen; and, in response, filtering the messages according to the type on a basis of the area, wherein a given area of the touchscreen is associated with one or more given types of the messages, as indicated by the message-type indicator.

13. The method of claim 10, wherein the filtering the messages according to the associated message-type filter condition further comprises:

providing, at the display, indicators associated with types of the messages including the message-type indicator;

determining that the area includes the change in direction and the message-type indicator associated with a given type of the messages; and, in response, filtering the messages according to the given type.

14. The method of claim 10, wherein the filtering the messages according to the read status using the second filtering condition comprises:

determining that the second portion is received within a threshold time period; and, in response, filtering the messages according to the read status so that only one or more of the unread messages remain.

15. The method of claim 10, wherein the filtering the messages according to the read status using the second filtering condition comprises:

determining that the second portion includes one or more of: touch input at a bezel portion of the touchscreen, and static touch input greater than or equal to a given time period; and, in response, filtering the messages according to the read status so that only one or more of the unread messages remain.

16. The method of claim 10, wherein the filtering the messages according to the read status using the second filtering condition comprises selecting only a most recent unread message.

17. The method of claim 10, wherein the filtering the messages according to the read status using the second filtering condition comprises selecting only a most recent unread message of a given type, the given type selected based on one or more of: a length of the first portion, an area of the change in direction at the touchscreen, and determining that the area of the change in direction at the touchscreen includes a given indicator associated with the given type.

18. A non-transitory computer-readable medium storing a computer program, wherein execution of the computer program is for:

at a device comprising: a processor; a memory storing messages of different types, at least a subset of the messages designated as unread messages; and a touchscreen including a display, providing message-type indicators in different areas of the touchscreen;

detecting, using the processor, a sliding touch input at the touchscreen, the sliding touch input comprising a first portion in a first direction and a second portion in a second direction such that the sliding touch input includes a change in direction, the second direction perpendicular to the first direction, and the different areas along the first portion;

determining that an end of the first portion is in an area that includes a given message-type indicator to identify an associated message-type filter condition associated with the first portion, the change in direction also in the area; and, in response, filtering the messages at the processor according to the message-type filtering condition associated with the first portion and a second filtering condition associated with the second portion, the filtering the messages according to the associated message-type filter condition further comprising: determining one or more of: a length of the first portion does not terminate in any of areas of the touchscreen associated with any of the types of the messages; the change in direction at the touchscreen does not occur in any of the areas; and a respective area of the change in direction does not include a given indicator associated with any of the types of the messages, including the message-type indicator; and, in response, one or more of: filtering the messages to include all the types of the messages; and, filtering the messages according to a given previous filtering condition.

* * * * *